US012134276B2

(12) United States Patent
Oki et al.

(10) Patent No.: US 12,134,276 B2
(45) **Date of Patent: *Nov. 5, 2024**

(54) LIQUID CARTRIDGE INCLUDING PLATE MEMBER PIVOTALLY MOVABLE BETWEEN FIRST POSTURE AND SECOND POSTURE

(71) Applicant: BROTHER KOGYO KABUSHIKI KAISHA, Nagoya (JP)

(72) Inventors: Satoru Oki, Nagoya (JP); Masahiro Hayashi, Nishio (JP); Nanami Abe, Niigata (JP); Naoya Okazaki, Hashima (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 86 days.

This patent is subject to a terminal disclaimer.

(21) Appl. No.: 17/817,050

(22) Filed: Aug. 3, 2022

(65) Prior Publication Data

US 2023/0045050 A1 Feb. 9, 2023

(30) Foreign Application Priority Data

Aug. 4, 2021 (JP) ................................ 2021-128072

(51) Int. Cl.
*B41J 2/175* (2006.01)

(52) U.S. Cl.
CPC .. *B41J 2/17566* (2013.01); *B41J 2002/17573* (2013.01)

(58) Field of Classification Search
CPC .......... B41J 2/17566; B41J 2002/17573; B41J 2/1753
See application file for complete search history.

(56) References Cited

U.S. PATENT DOCUMENTS

2017/0282584 A1 10/2017 Nukui
2023/0045115 A1* 2/2023 Oki ..................... B41J 2/17553

FOREIGN PATENT DOCUMENTS

JP 2017-177731 A 10/2017
JP 2018-51907 A 4/2018

* cited by examiner

*Primary Examiner* — Sharon Polk
(74) *Attorney, Agent, or Firm* — Merchant & Gould P.C.

(57) ABSTRACT

A liquid cartridge includes: a cartridge case defining therein a liquid storage chamber; a liquid supply portion; a circuit board; a plate member; and a residual-amount detecting portion. The residual-amount detecting portion is configured to change a state of incident light according to an amount of the liquid stored in the liquid storage chamber, and includes an optical access portion on which light traveling in a left-right direction is incident. The plate member is pivotally movable between: a first posture where a portion of the plate member is positioned upward relative to the optical access portion; and a second posture where the plate member is positioned downward relative to the optical access portion. The plate member in the first posture and the residual-amount detecting portion define a light transmissive region therebetween in the front-rear direction. The light transmissive region has a light transmittance greater than that of the plate member.

23 Claims, 21 Drawing Sheets

LIQUID CARTRIDGE INCLUDING PLATE MEMBER PIVOTALLY MOVABLE BETWEEN FIRST POSTURE AND SECOND POSTURE

REFERENCE TO RELATED APPLICATIONS

This application claims priority from Japanese Patent Application No. 2021-128072 filed on Aug. 4, 2021. The entire content of the priority application is incorporated herein by reference.

BACKGROUND ART

Conventionally, there has been known an inkjet recording apparatus configured to print an image on a recording medium by ejecting ink stored in an ink cartridge through nozzles. Whenever ink stored in an ink cartridge runs out, a new ink cartridge is detachably mounted in such an inkjet recording apparatus.

For example, a prior art discloses an ink cartridge attachable to and detachable from a printer. The ink cartridge has a front surface on which an ink supply portion is disposed. During attachment of the ink cartridge to the printer, an ink needle of the printer is inserted into the ink supply portion, thereby providing positioning of the ink cartridge in the printer. Further, an IC board, a detection-target portion, and a light-blocking plate are mounted on an upper surface of a housing of the ink cartridge. Upon attachment of the ink cartridge to the printer, the IC board is electrically connected to contacts of the printer, and the detection-target portion and the light-blocking plate are respectively detected by a residual amount sensor and an attachment sensor of the printer.

DESCRIPTION

In terms of design freedom and production costs, it is preferable that the number of sensors provided in a printer be smaller in terms of design freedom and production costs. It is also preferable that an ink cartridge be resistant to deformation which may be possibly caused by impacts impinged on the ink cartridge at the time of attachment to the printer or falling onto a floor.

In view of the foregoing, it is an object of the present disclosure to provide a liquid cartridge capable of reducing the number of sensors for a printer and hard to get damaged by impacts, and a liquid-consuming device including the liquid cartridge.

In order to attain the above and other object, the present disclosure provides a liquid cartridge movable relative to a printer in a front-rear direction crossing an up-down direction along a gravitational direction to be attached to a printer in an attached posture. The liquid cartridge includes: a cartridge case; a liquid supply portion; a circuit board; a plate member; and a residual-amount detecting portion. The cartridge case defines therein a liquid storage chamber. The cartridge case has a front surface. The liquid supply portion protrudes frontward from the front surface of the cartridge case and is configured to supply liquid stored in the liquid storage chamber to an outside. The circuit board includes an electrode group including at least three electrodes. The at least three electrodes face upward and are exposed to the outside in the attached posture. The plate member extends in the front-rear direction and is positioned rearward of the electrode group in the attached posture. The residual-amount detecting portion is positioned upward relative to the electrode group and rearward of the plate member in the attached posture. The residual-amount detecting portion is configured to change a state of incident light according to an amount of the liquid stored in the liquid storage chamber. The residual-amount detecting portion includes an optical access portion on which light traveling in a left-right direction crossing the up-down direction and the front-rear direction is incident in the attached posture. The plate member is pivotally movable about an axis extending in the left-right direction between: a first posture in which a portion of the plate member is positioned upward relative to the optical access portion; and a second posture in which the plate member is positioned downward relative to the optical access portion. The plate member in the second posture is positioned rearward relative to the plate member in the first posture. The plate member in the first posture and the residual-amount detecting portion define a light transmissive region therebetween in the front-rear direction. The light transmissive region has a light transmittance greater than a light transmittance of the plate member.

In the above configuration, the plate member in the first posture, the light transmissive region, and the residual-amount detecting portion can be detected by a single sensor configured to detect the light traveling in the left-right direction. The plate member is pivotally movable in case that an impact may be applied to the liquid cartridge during the attachment of the cartridge to the printer or in case of a fall of the liquid cartridge. Accordingly, the plate member is less likely to get damaged.

According to another aspect, the present disclosure also provides a liquid cartridge including: a cartridge case; a liquid supply portion; a circuit board; a plate member; and a cartridge detecting portion. The cartridge case defines therein a liquid storage chamber. The liquid supply portion protrudes frontward from the cartridge case in a front-rear direction and is configured to supply liquid stored in the liquid storage chamber to an outside. The circuit board is positioned upward relative to and away from the liquid supply portion in an up-down direction crossing the front-rear direction. The circuit board includes an electrode group including at least three electrodes. The at least three electrodes face upward in the up-down direction and are exposed to the outside. The plate member extends in the front-rear direction and is positioned rearward of the electrode group. The cartridge detecting portion includes an optical access portion positioned upward relative to the electrode group in the up-down direction and rearward of the plate member. The optical access portion is accessible by light traveling in a left-right direction crossing the up-down direction and the front-rear direction. The plate member is pivotally movable about an axis extending in the left-right direction between: a first posture in which a portion of the plate member is positioned upward relative to the optical access portion in the up-down direction; and a second posture in which the plate member is positioned downward relative to the optical access portion in the up-down direction. The plate member in the second posture is positioned rearward relative to the plate member in the first posture. The plate member in the first posture and the cartridge detecting portion are spaced apart from each other in the front-rear direction.

Even in the above configuration, the plate member in the first posture and the cartridge detecting portion those are spaced apart from each other can be detected by a single sensor configured to detect the light traveling in the left-right direction. Since the plate member is pivotally movable in case that an impact may be applied to the liquid cartridge or in case of a fall of the liquid cartridge, the plate member is less likely to get damaged.

Figure 1:
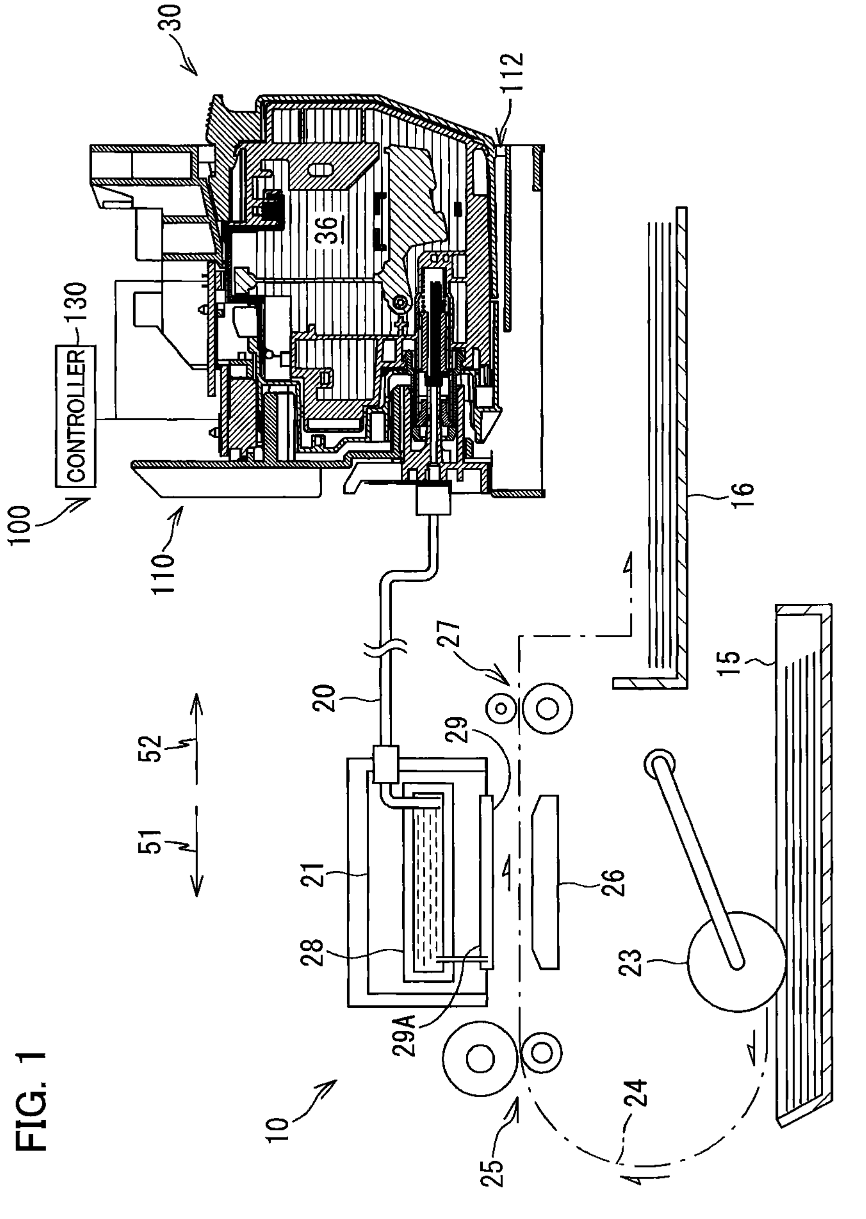
FIG. 1 is a schematic cross-sectional diagram conceptually illustrating an internal configuration of a printer including a cartridge-attachment section.

Hereinafter, one embodiment of the present disclosure will be described in detail while referring to accompanying drawings. It would be apparent to those skilled in the art that the embodiment described below is merely an example of the present disclosure and many modifications and variations may be made thereto.

In the following description, a frontward direction 51 is defined as a direction in which an ink cartridge 30 according to the embodiment is inserted into a cartridge-attachment section 110, and a rearward direction 52 is defined as a direction opposite the frontward direction 51, that is, a direction in which the ink cartridge 30 is extracted from the cartridge-attachment section 110. In the present embodiment, the frontward direction 51 and the rearward direction 52 are parallel to a horizontal direction which is perpendicular to a gravitational direction. However, the frontward direction 51 and the rearward direction 52 need not be parallel to the horizontal direction.

Further, a downward direction 53 is defined as a direction coincident with the gravitational direction, and an upward direction 54 is defined as a direction opposite the downward direction 53 (the gravitational direction). Further, a rightward direction 55 and a leftward direction 56 are defined as directions perpendicular to both the frontward direction 51 and the downward direction 53. More specifically, in a state where the ink cartridge 30 has been completely received in the cartridge-attachment section 110, i.e., in a state where the ink cartridge 30 is in an attached posture (an attached state of the ink cartridge 30), and when a user views the ink cartridge 30 from its front side, the rightward direction 55 is a direction toward the right and the leftward direction 56 is a direction toward the left.

In the following description, whenever appropriate, the frontward direction 51 and the rearward direction 52 will be collectively referred to as a front-rear direction 51 and 52, the upward direction 54 and the downward direction 53 will be collectively referred to as an up-down direction 53 and 54, and the rightward direction 55 and the leftward direction 56 will be collectively referred to as a left-right direction 55 and 56.

Further, in this specification, "facing frontward" includes facing in a direction including a frontward component, "facing rearward" includes facing in a direction including a rearward component, "facing downward" includes facing in a direction including a downward component, and "facing upward" includes facing in a direction including an upward component. For example, "a front surface faces frontward" denotes that the front surface may face in a frontward direction, or the front surface may face in a direction inclined relative to the frontward direction.

<Overview of Printer 10>

A printer 10 illustrated in FIG. 1 is configured to form an image by selectively ejecting ink droplets onto a sheet based on an inkjet recording system. The printer 10 includes a recording head 21, an ink-supplying device 100, and ink tubes 20 connecting the recording head 21 and the ink-supplying device 100 to each other. The ink-supplying device 100 includes the cartridge-attachment section 110. The cartridge-attachment section 110 can detachably receive the ink cartridges 30 therein.

The cartridge-attachment section 110 has a surface formed with an opening 112. The ink cartridges 30 can be inserted into the cartridge-attachment section 110 in the frontward direction 51 through the opening 112, and extracted from the cartridge-attachment section 110 in the rearward direction 52 through the opening 112.

The ink cartridges 30 store therein ink that can be used by the printer 10 for printing. The ink cartridge 30 is connected to the recording head 21 through the corresponding ink tube 20 when the ink cartridge 30 has been completely mounted in the cartridge-attachment section 110.

The recording head 21 includes a sub tank 28 for temporarily storing ink supplied from the ink cartridge 30 through the ink tube 20. The recording head 21 also includes a plurality of nozzles 29 through which the ink supplied from the sub tank 28 is selectively ejected in accordance with the inkjet recording system. More specifically, the recording head 21 includes a head control board (not illustrated), and piezoelectric elements 29A each corresponding to one of the nozzles 29. The head control board is configured to selectively apply drive voltages to the respective piezoelectric elements 29A to eject ink selectively through the nozzles 29. In this way, the recording head 21 is configured to consume the ink stored in the ink cartridge 30 attached to the cartridge-attachment section 110.

The printer 10 also includes a sheet tray 15, a sheet feeding roller 23, a conveying path 24, a pair of conveying rollers 25, a platen 26, a pair of discharge rollers 27, and a discharge tray 16. A sheet(s) accommodated in the sheet tray 15 is fed therefrom by the sheet feeding roller 23 to the conveying path 24, and then conveyed by the conveying rollers 25 onto the platen 26. The recording head 21 is configured to selectively eject ink onto the sheet as the sheet moves over the platen 26, thereby recording an image on the sheet. The sheet that have passed the platen 26 is then discharged by the discharge rollers 27 onto the discharge tray 16 disposed at a downstream end of the conveying path 24.

<Ink-Supplying Device 100>

The ink-supplying device 100 is provided in the printer 10, as illustrated in FIG. 1. The ink-supplying device 100 functions to supply ink to the recording head 21. As described above, the ink-supplying device 100 includes the cartridge-attachment section 110 for detachably receive the ink cartridge 30 therein. FIG. 1 illustrates a state where the ink cartridge 30 has been completely received in the cartridge-attachment section 110. In other words, the ink cartridge 30 is in the attached state in FIG. 1.

<Cartridge-Attachment Section 110>

Figure 2:
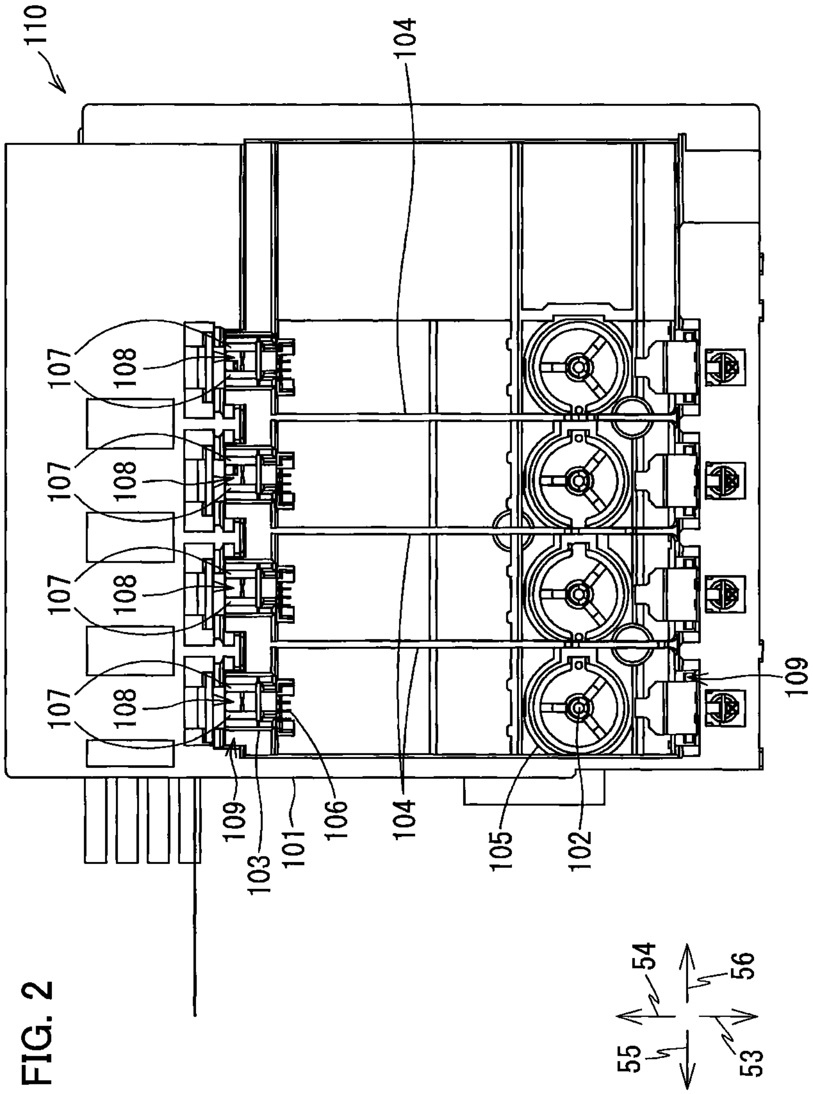
FIG. 2 is a view illustrating an external appearance of the cartridge-attachment section.
Figure 10:
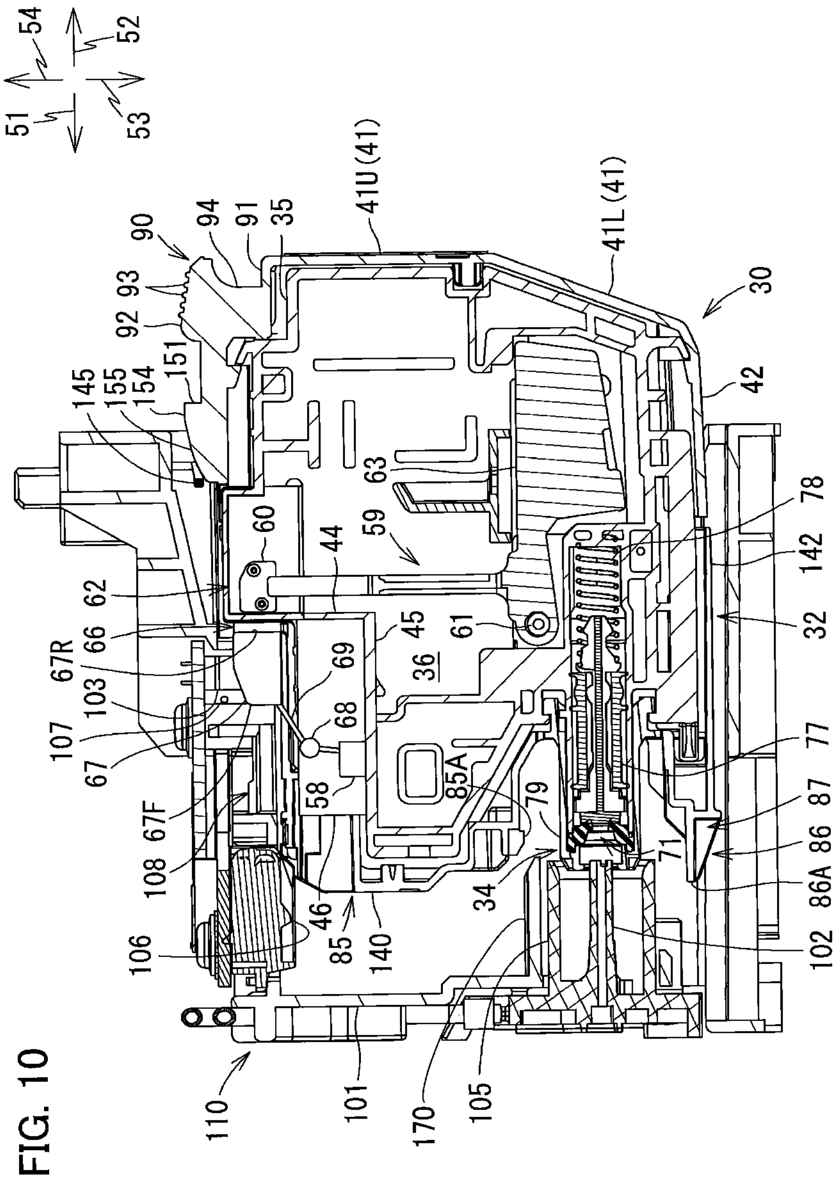
FIG. 10 is a vertical cross-sectional view of the ink cartridge and the cartridge-attachment section, and illustrating a state where a light-blocking plate is detected by a sensor.

As illustrated in FIGS. 2 and 10, the cartridge-attachment section 110 includes a case 101, four ink needles 102, four sensors 103, four sets of three contacts 106, and a locking portion 145. In the cartridge-attachment section 110, four kinds of ink cartridges 30 corresponding to four colors of cyan, magenta, yellow and black are detachably mountable. Accordingly, one ink needle 102, one sensor 103, and one set of three contacts 106 are provided for each of the four kinds of ink cartridges 30.

<Case 101>

The case 101 constitutes a housing of the cartridge-attachment section 110. The case 101 has a box-like shape defining an internal space therein and has an open end serving as the opening 112. Specifically, the case 101 includes a top wall defining a ceiling of the internal space, a bottom wall defining a bottom of the internal space, and an end wall connecting the top wall and the bottom wall to each other. The opening 112 of the case 101 is positioned opposite the end wall in the front-rear direction 51 and 52. The opening 112 can be exposed to a surface (user-interface surface) that a user faces when using the printer 10.

The four kinds of ink cartridges 30 can be inserted into and removed from the case 101 through the opening 112. In the case 101, each of the top wall and the bottom wall is formed with four guide grooves 109 for guiding insertion and removal of the ink cartridges 30. Specifically, when the ink cartridge 30 is inserted into and removed from the case 101 through the opening 112, upper and lower ends of the ink cartridge 30 are received in the corresponding guide grooves 109 in the top wall and the bottom wall and guided thereby in the front-rear direction 51 and 52, as illustrated in FIG. 10. Further, the case 101 also includes three plates 104 that partition the internal space into four individual spaces each elongated in the up-down direction 53 and 54. Each of the four ink cartridges 30 can be mounted in a corresponding one of the four spaces defined in the case 101 by the plates 104.

<Ink Needles 102>

Each of the ink needles 102 is formed of resin and has a generally tubular shape. As illustrated in FIG. 10, the ink needles 102 are disposed on a lower end portion of the end wall constituting the case 101. Specifically, each of the ink needles 102 is arranged at a position corresponding to an ink supply portion 34 (described later) of the corresponding ink cartridge 30 mounted in the cartridge-attachment section 110. Each of the ink needles 102 protrudes rearward from the end wall of the case 101.

Four cylindrical-shaped guide portions 105 are provided on the end wall to surround the corresponding ink needles 102. Each of the guide portions 105 protrudes rearward from the end wall to have a protruding end that is open rearward. Each of the ink needles 102 is positioned at a diametrical center of the corresponding guide portion 105. Each of the guide portions 105 is shaped to allow the ink supply portion 34 of the corresponding ink cartridge 30 to be inserted therein.

Figure 11:
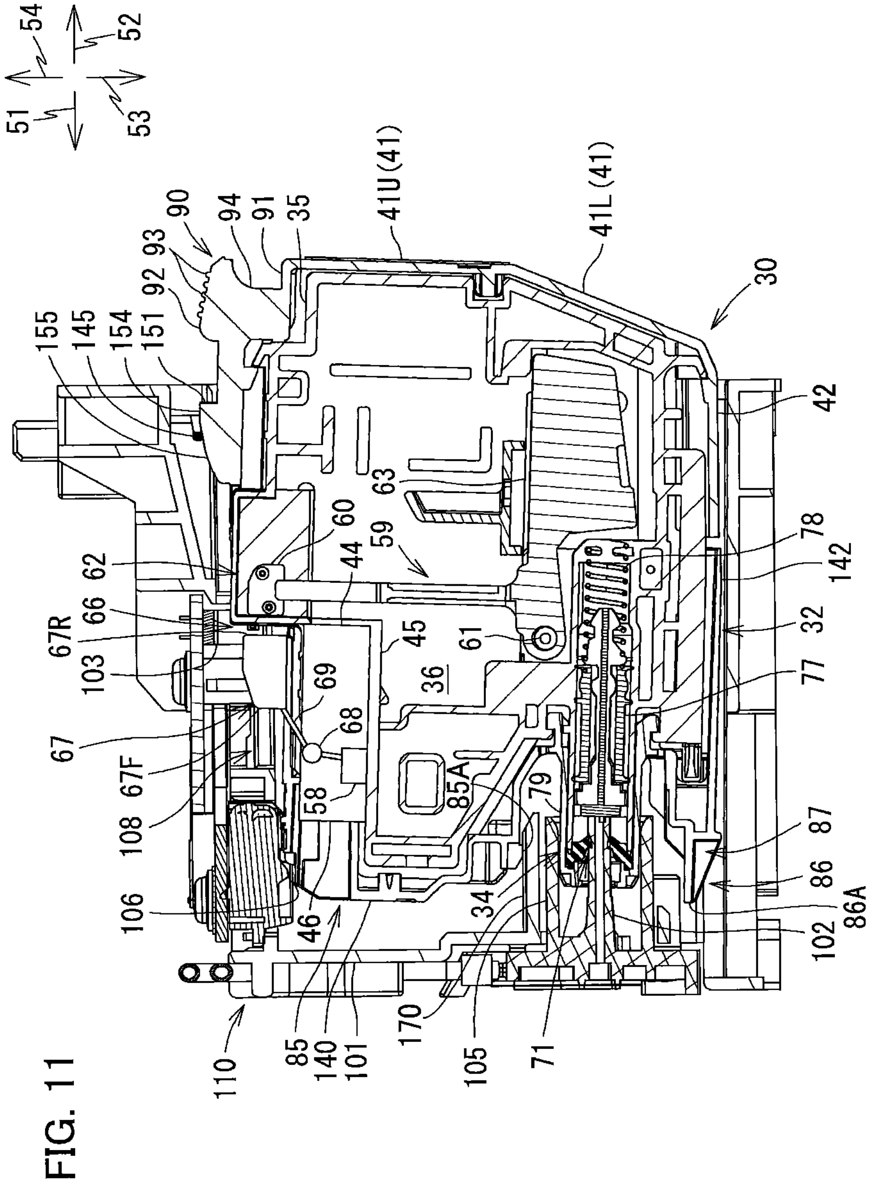
FIG. 11 is a vertical cross-sectional view of the ink cartridge and the cartridge-attachment section, and illustrating a state where; the ink needle is inserted into an ink supply port; and a space is positioned at an optical path of the sensor.

During insertion of the ink cartridge 30 into the cartridge-attachment section 110 in the frontward direction 51, i.e., in the course of action for bringing the ink cartridge 30 into an attached position attached to the cartridge-attachment section 110, the ink supply portion 34 of the ink cartridge 30 enters the corresponding guide portion 105 (see FIG. 11). As the ink cartridge 30 is further inserted frontward, the ink needle 102 enters into an ink supply port 71 of the ink supply portion 34. The ink needle 102 is thus connected to the ink supply portion 34, which provides positioning of the ink supply portion 34 relative to the cartridge-attachment section 110.

Since the ink needle 102 and the ink supply portion 34 are in communication with each other, ink stored in an ink chamber 36 formed in the ink cartridge 30 is allowed to flow into the ink tube 20 connected to the ink needle 102 through an internal space defined in the ink supply portion 34 and an inner space defined in the ink needle 102. Incidentally, the ink needle 102 may have a flat-shaped tip end or a pointed tip end.

<Locking Portion 145>

As illustrated in FIG. 10, the locking portion 145 extends in the left-right direction 55 and 56 at a position near the top wall of the case 101 and adjacent to the opening 112. The locking portion 145 is a rod-shaped member extending in the left-right direction 55 and 56. For example, the locking portion 145 is a columnar member made of meal. Left and right ends of the locking portion 145 are respectively connected and fixed to left and right side walls constituting the case 101. Hence, the locking portion 145 is immovable relative to the case 101 and does not make any relative movement (such as pivotal movement) to the case 101. The locking portion 145 extends in the left-right direction 55 and 56 across the four individual spaces defined in the case 101. In each of the four spaces for receiving corresponding one of the ink cartridges 30, the locking portion 145 is accessible from below and from frontward by the ink cartridge 30 inserted in the space of the case 101 due to a space available around the locking portion 145.

The locking portion 145 functions to hold the ink cartridge 30 in its attached position in the cartridge-attachment section 110. Specifically, the ink cartridge 30 inserted in the cartridge-attachment section 110 is pivotally moved upward into the attached posture to be engaged with the locking portion 145, so that the locking portion 145 can hold the ink cartridge 30 in the attached posture (the attached position) in the cartridge-attachment section 110 against a rearward urging force generated by a coil spring 78 in the ink cartridge 30.

<Contacts 106>

As illustrated in FIGS. 2 and 10, four sets of three contacts 106 are disposed on the top wall of the case 101 at positions near the end wall of the case 101. As illustrated in FIG. 2, the three contacts 106 in each set are arranged to be spaced apart from one another in the left-right direction 55 and 56. This arrangement of the three contacts 106 in each set corresponds to an arrangement of an electrode group 65 (consisting of three electrodes 65A to 65C as will be described later) of the ink cartridge 30 (see FIGS. 3A and 4A). Each of the contacts 106 is formed of a material having electrical conductivity and resiliency. The contacts 106 are upwardly resiliently deformable.

As described earlier, four sets of the three contacts 106 are provided at the case 101 for the respective four kinds of ink cartridges 30 mountable in the case 101.

Each of the contacts 106 is electrically connected to a controller 130 (see FIG. 1) provided in the printer 10 via electrical circuits. The controller 130 includes a CPU, a ROM, and a RAM, for example. The controller 130 may be configured as a controller of the printer 10. When the contacts 106 are electrically connected to the electrode group 65 of the corresponding ink cartridge 30, a voltage Vc is applied to a power-supply electrode 65A; reading and writing of electrical signals are performed through a signal electrode 65B; and a ground electrode 65C is grounded. Due to the establishment of the electrical connection between the signal electrode 65B and the corresponding contact 106, data stored in an IC of the ink cartridge 30 is made electrically accessible. Outputs from the electrical circuits are inputted into the controller 130.

<Sensors 103>

As illustrated in FIGS. 2 and 10, four of the sensors 103 are disposed at the top wall of the case 101. Each of the sensors 103 includes a light-emitting element and a light-receiving element. The light-emitting element and the light-receiving element are arranged to oppose and to be spaced apart from each other in the left-right direction 55 and 56. When the ink cartridge 30 has been attached to the cartridge-attachment section 110, a detection portion 62 (described later) of the ink cartridge 30 is positioned between the light-emitting element and the light-receiving element of the corresponding sensor 103 in the left-right direction 55 and 56. In other words, the light-emitting element and the light-receiving element of the sensor 103 are arranged to oppose each other with the detection portion 62 of the attached ink cartridge 30 interposed therebetween. The light-emitting element is configured to emit light in the left-right direction 55 and 56, and the light-receiving element is configured to receive the light emitted from the light-emitting element.

The sensor 103 is configured to output different detection signals depending on whether light emitted from the light-emitting element is received by the light-receiving element. For example, the sensor 103 outputs a low-level signal (a signal whose level is less than a threshold level) when the light emitted from the light-emitting element is not received by the light-receiving element (i.e., when an intensity of the light received at the light-receiving element is less than a predetermined intensity). On the other hand, the sensor 103 outputs a high-level signal (a signal whose level is equal to or greater than the threshold level) when the light emitted from the light-emitting element is received by the light-receiving element (i.e., when the intensity of the light received at the light-receiving element is equal to or greater than the predetermined intensity).

Figure 14:
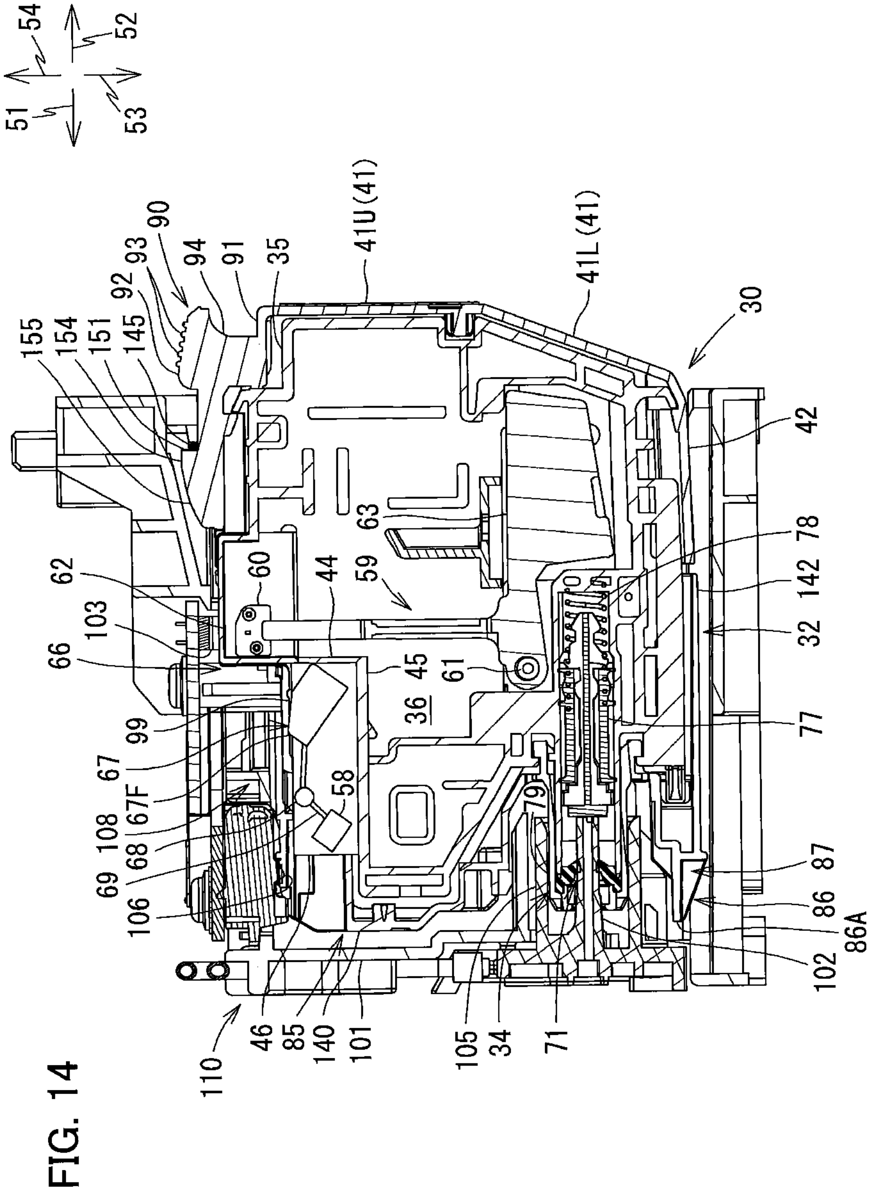
FIG. 14 is a vertical cross-sectional view of the ink cartridge and the cartridge-attachment section, and illustrating a state where the light-blocking plate is in contact with a wall surface of the cartridge-attachment section.

As illustrated in FIGS. 2 and 14, slits 108 are formed near the top wall of the case 101 at positions rearward of the corresponding three contacts 106 and frontward of the corresponding sensors 103. Each of the slits 108 allows a light-blocking plate 67 (described later) of the corresponding ink cartridge 30 to enter therein. Each of the slits 108 has a width in the left-right direction 55 and 56 smaller than that of the corresponding guide grooves 109. Wall surfaces 107 facing rearward are positioned at a boundary between the corresponding guide grooves 109 in the top wall of the case 101 and the corresponding slits 108. Each of the slits 108 is open at a center portion in the left-right direction 55 and 56 on the corresponding wall surface 107.

<Ink Cartridges 30>

The ink cartridge 30 illustrated in FIGS. 3A to 9 is a container configured to store ink therein. The ink cartridge 30 defines an inner space therein serving as the ink chamber 36 configured to store ink. In the present embodiment, the ink chamber 36 is formed by an inner frame 35 which is accommodated in a rear cover 31 and a front cover 32 those constituting an outer shell of the ink cartridge 30.

The posture of the ink cartridge 30 illustrated in FIGS. 3A to 5 and 9 is a posture when the ink cartridge 30 is in the attached state, i.e., the attached posture of the ink cartridge 30. As will be described later, the ink cartridge 30 includes a front wall 140, a rear wall 41, top walls 39 and 141, and bottom walls 42 and 142. In the attached posture of the ink cartridge 30 illustrated in FIGS. 3A to 5 and 9, a direction from the rear wall 41 toward the front wall 140 is coincident with the frontward direction 51; a direction from the front wall 140 toward the rear wall 41 is coincident with the rearward direction 52; a direction from the top walls 39 and 141 toward the bottom walls 42 and 142 is coincident with the downward direction 53, and a direction from the bottom walls 42 and 142 toward the top walls 39 and 141 is coincident with the upward direction 54.

In the attached state of the ink cartridge 30 to the cartridge-attachment section 110, the front wall 140 faces frontward; the rear wall 41 faces rearward; the bottom walls 42 and 142 face downward; and the top walls 39 and 141 face upward.

As illustrated in FIGS. 3A to 9, the ink cartridge 30 includes the rear cover 31, the front cover 32, and the inner frame 35 defining the ink chamber 36. The rear cover 31 has a substantially rectangular parallelepiped shape. The front cover 32 includes the front wall 140. The front cover 32 is assembled to the rear cover 31 to form the outer shell of the ink cartridge 30. The inner frame 35 is accommodated in the rear cover 31 and the front cover 32 assembled to each other.

In the attached posture, the ink cartridge 30 has a depth in the front-rear direction 51 and 52, a height in the up-down direction 53 and 54, and a width in the left-right direction 55 and 56. The ink cartridge 30 has a generally flat shape having the height in the up-down direction 53 and 54 and the depth in the front-rear direction 51 and 52 greater than the width in the left-right direction 55 and 56. A front surface of the front wall 140 is a surface of the front cover 32 facing frontward during insertion of the ink cartridge 30 into the cartridge-attachment section 110. A rear surface of the rear wall 41 is a surface of the rear cover 31 facing backward during the insertion of the ink cartridge 30 into the cartridge-attachment section 110. That is, the rear wall 41 and the front wall 140 are disposed to oppose each other with the ink chamber 36 interposed therebetween in the attached posture of the ink cartridge 30.

<Rear Cover 31>

As illustrated in FIGS. 3A to 4B, the rear cover 31 includes the rear wall 41, side walls 37 and 38, the top wall 39, and the bottom wall 42. The side walls 37 and 38 are spaced apart from each other in the left-right direction 55 and 56. The top wall 39 and the bottom wall 42 are spaced apart from each other in the up-down direction 53 and 54. The side walls 37 and 38, the top wall 39 and the bottom wall 42 extend frontward from the rear wall 41. That is, the rear cover 31 has a box-like shape formed with an opening that is open frontward. The inner frame 35 is inserted into the rear cover 31 via this opening. In other words, the rear cover 31 covers a rear portion of the inner frame 35. In a state where the inner frame 35 is inserted in the rear cover 31, the ink chamber 36 is arranged to be interposed between the top wall 39 and the bottom wall 42.

Figure 5:
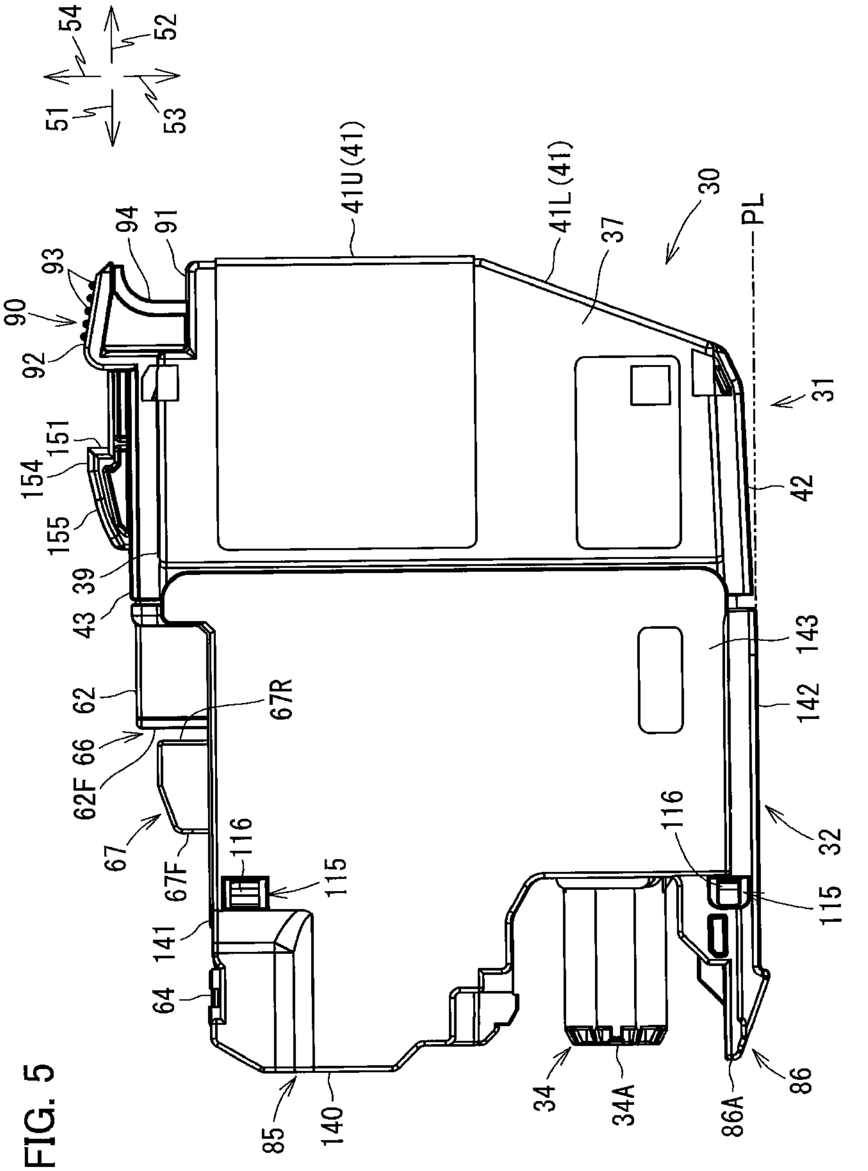
FIG. 5 is a right side view of the ink cartridge.

As illustrated in FIG. 5, the rear cover 31 is positioned rearward of the front cover 32 in the attached posture of the ink cartridge 30. Specifically, in the present embodiment, the rear cover 31 and the front cover 32 are assembled to each other such that a rear end portion of the front cover 32 is overlapped with a front end portion (outer surface thereof) of the rear cover 31 to form a boundary between the rear cover 31 and the front cover 32 on each side surface of the ink cartridge 30. Alternatively, the front end portion of the rear cover 31 may be overlapped with the rear end portion (outer surface thereof) of the front cover 32 to form the boundary between the rear cover 31 and the front cover 32 on each side surface of the ink cartridge 30, or the rear end portion of the front cover 32 and the front end portion of the rear cover 31 may face each other in the front-rear direction 51 and 52 to form the boundary between the rear cover 31 and the front cover 32.

The rear wall 41 includes an upper portion 41U and a lower portion 41L, as illustrated in FIGS. 3A to 4B. The upper portion 41U is arranged above the lower portion 41L. The lower portion 41L is positioned frontward relative to the upper portion 41U. The upper portion 41U and the lower portion 41L are both planar shaped, and intersect each other but are not perpendicular to each other. Specifically, the lower portion 41L is inclined relative to the up-down direction 53 and 54 such that the lower portion 41L extends closer to the front wall 140 toward the bottom wall 42.

As illustrated in FIG. 5, the bottom wall 42 is inclined relative to the front-rear direction 51 and 52 such that a front end of the bottom wall 42 is positioned lower than a rear end of the bottom wall 42. Note that, a phantom line PL parallel to the front-rear direction 51 and 52 is indicated in FIG. 5 in order to clarify the slope of the bottom wall 42 relative to the front-rear direction 51 and 52. The front end of the bottom wall 42 constitutes a front end of the rear cover 31. The front end of the bottom wall 42 is positioned frontward of a locking surface 151 (described later) of the ink cartridge 30. The rear end of the bottom wall 42 is connected to a lower end of the lower portion 41L of the rear wall 41.

Figure 3A:
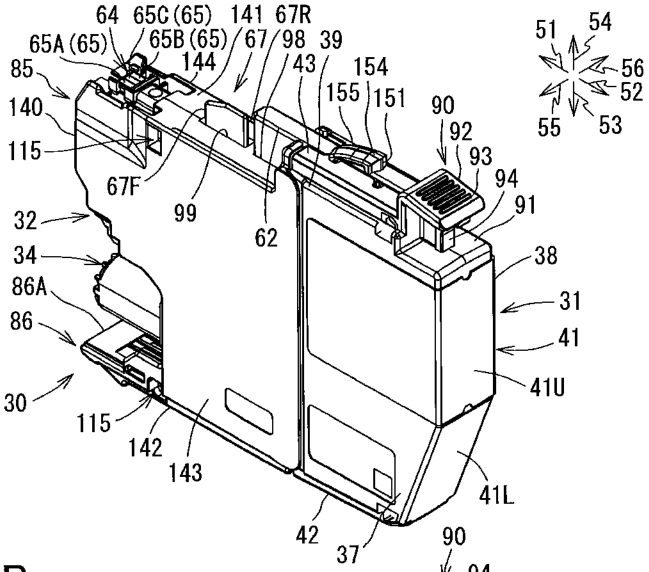
FIG. 3A is a perspective view illustrating an external appearance of an ink cartridge as viewed from a perspective rearward and upward thereof.
Figure 3B:
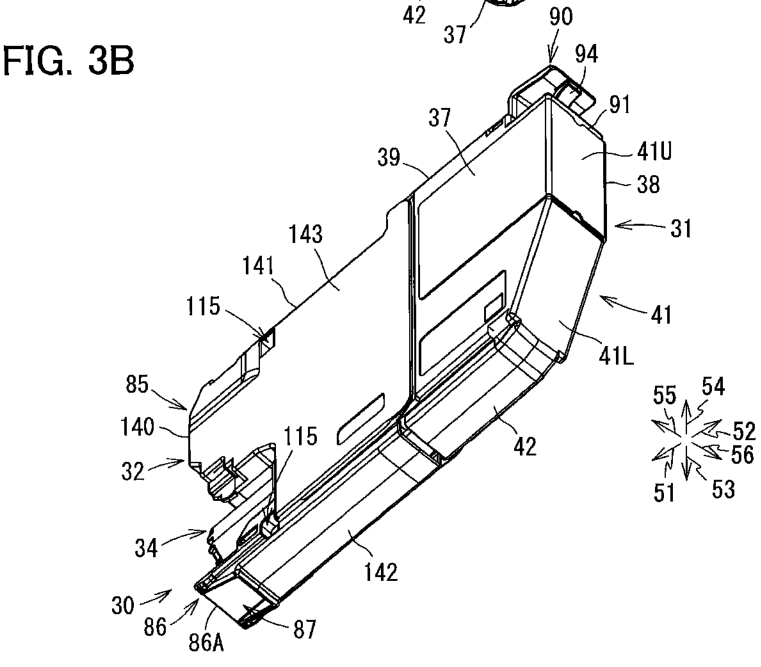
FIG. 3B is a perspective view illustrating the external appearance of the ink cartridge as viewed from a perspective rearward and downward thereof.
Figure 4A:
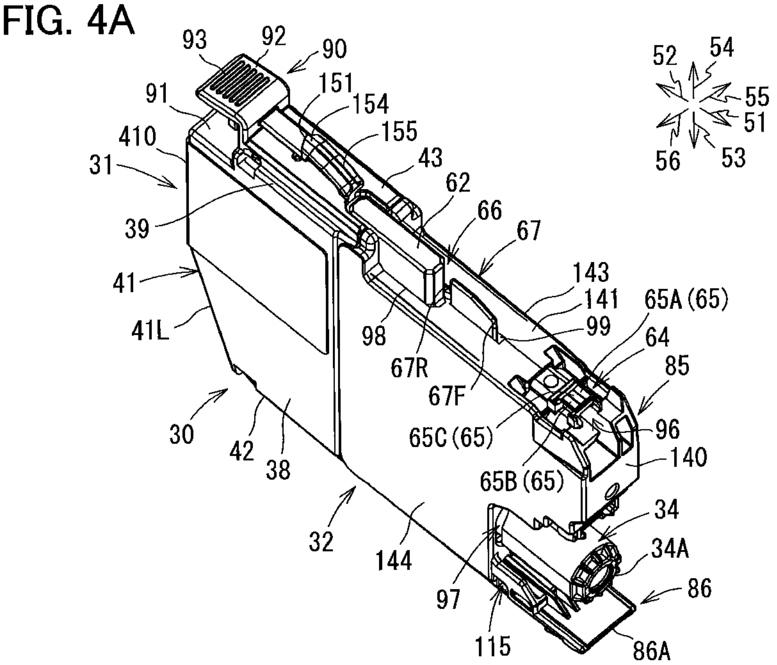
FIG. 4A is a perspective view illustrating the external appearance of the ink cartridge as viewed from a perspective frontward and upward thereof.
Figure 4B:
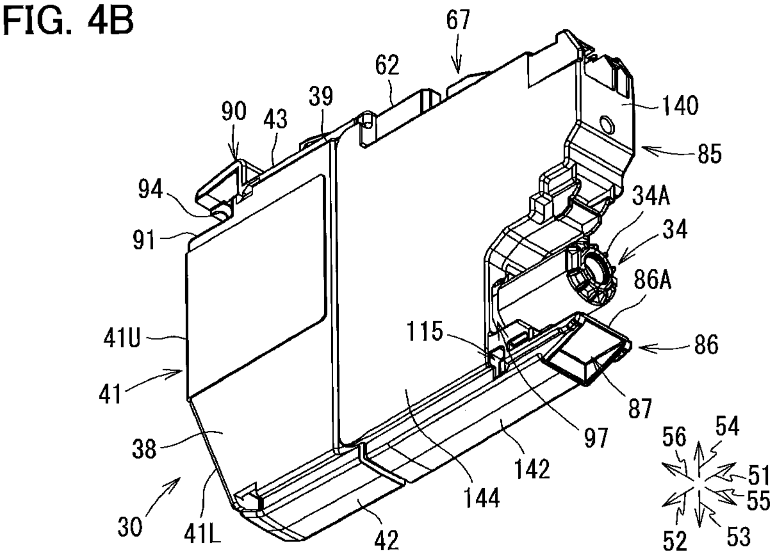
FIG. 4B is a perspective view illustrating the external appearance of the ink cartridge as viewed from a perspective frontward and downward thereof.

As illustrated in FIGS. 3A and 4A, a protrusion 43 is provided on a top surface of the top wall 39 of the rear cover 31. The protrusion 43 is arranged on a center of the top wall 39 in the left-right direction 55 and 56 to extend in the front-rear direction 51 and 52. The protrusion 43 has a rear surface facing rearward and extending in the up-down direction 53 and 54. This rear surface of the protrusion 43 functions as the locking surface 151 of the ink cartridge 30. The locking surface 151 is positioned above the bottom wall 42 of the rear cover 31.

The locking surface 151 is configured to face the locking portion 145 in the rearward direction 52 and abut on the locking portion 145 in the attached state of the ink cartridge 30 to the cartridge-attachment section 110. The abutment of the locking surface 151 on the locking portion 145 enables the ink cartridge 30 to be held in the attached state in the cartridge-attachment section 110 against a rearward urging force applied from the coil spring 78.

The protrusion 43 also has a horizontal surface 154, and a sloped surface 155. The horizontal surface 154 is connected to an upper edge of the locking surface 151 to extend frontward therefrom. The horizontal surface 154 is thus positioned frontward of the locking surface 151. The horizontal surface 154 is a surface extending in the front-rear direction 51 and 52 and in the left-right direction 55 and 56. The sloped surface 155 is connected to a front edge of the horizontal surface 154 to extend frontward therefrom. The sloped surface 155 is thus positioned frontward of the horizontal surface 154. The sloped surface 155 faces frontward and upward. In this way, the sloped surface 155 and locking surface 151 are connected to each other via the horizontal surface 154, so that a boundary edge between the locking surface 151 and the sloped surface 155 does not constitute a ridge-like shape.

During the insertion of the ink cartridge 30 into the cartridge-attachment section 110, the locking portion 145 is smoothly guided toward the rear beyond the locking surface 151 while making contact with and sliding along the sloped surface 155 and the horizontal surface 154.

An operation portion 90 is also provided on the top surface of the top wall 39 of the rear cover 31. The operation portion 90 is positioned rearward of the locking surface 151. The top surface of the top wall 39 has a rear end portion that is depressed downward from a remaining portion of the top surface of the top wall 39. This depressed portion (rear end portion) of the top surface of the top wall 39 serves as a sub-top surface 91. That is, the sub-top surface 91 is positioned lower than the remaining portion on the top surface of the top wall 39. The operation portion 90 is disposed upward relative to the sub-top surface 91 and is spaced apart therefrom. The operation portion 90 has a generally flat plate-like shape. Specifically, the operation portion 90 protrudes upward from a region near the boundary between the sub-top surface 91 and the remaining portion on the top surface of the top wall 39, extends further upward than the protrusion 43, and is then bent obliquely rearward and downward.

A rib 94 is provided between the sub-top surface 91 and the operation portion 90. The rib 94 connects the operation portion 90 to the sub-top surface 91 in the up-down direction 53 and 54, and extends in the front-rear direction 51 and 52.

Figure 8:
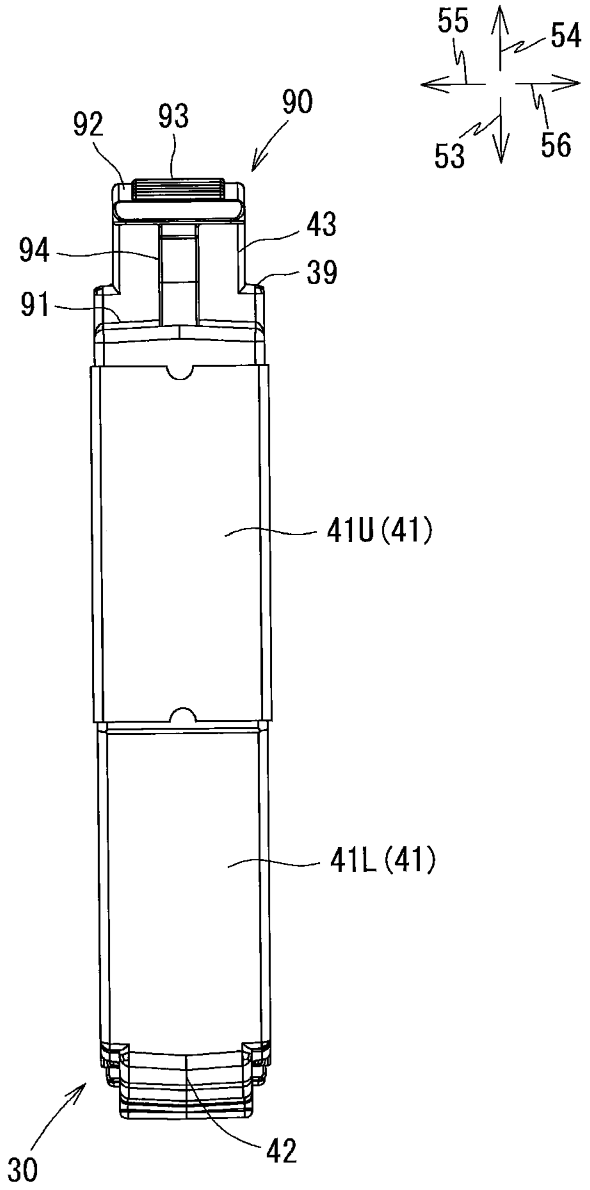
FIG. 8 is a rear view of the ink cartridge.

As illustrated in FIG. 8, with respect to the left-right direction 55 and 56, the rib 94 has a width that is smaller than each of a width of the sub-top surface 91 and a width of the operation portion 90.

The operation portion 90 has an operation surface 92 facing upward and rearward. The operation surface 92 and the sub-top surface 91 are aligned with each other at least partially in the up-down direction 53 and 54. In other words, when the ink cartridge 30 is viewed from above, the operation surface 92 and the sub-top surface 91 overlap with each other. On the operation surface 92, a plurality of ridges 93 is formed as a plurality of projections. The ridges 93 extend in the left-right direction 55 and 56 and are spaced apart from one another in the front-rear direction 51 and 52. These ridges 93 allow the user to easily recognize the operation surface 92. The ridges 93 can also serve to prevent a user's finger from slipping over the operation surface 92 when the user operates the operation surface 92.

Figure 6:
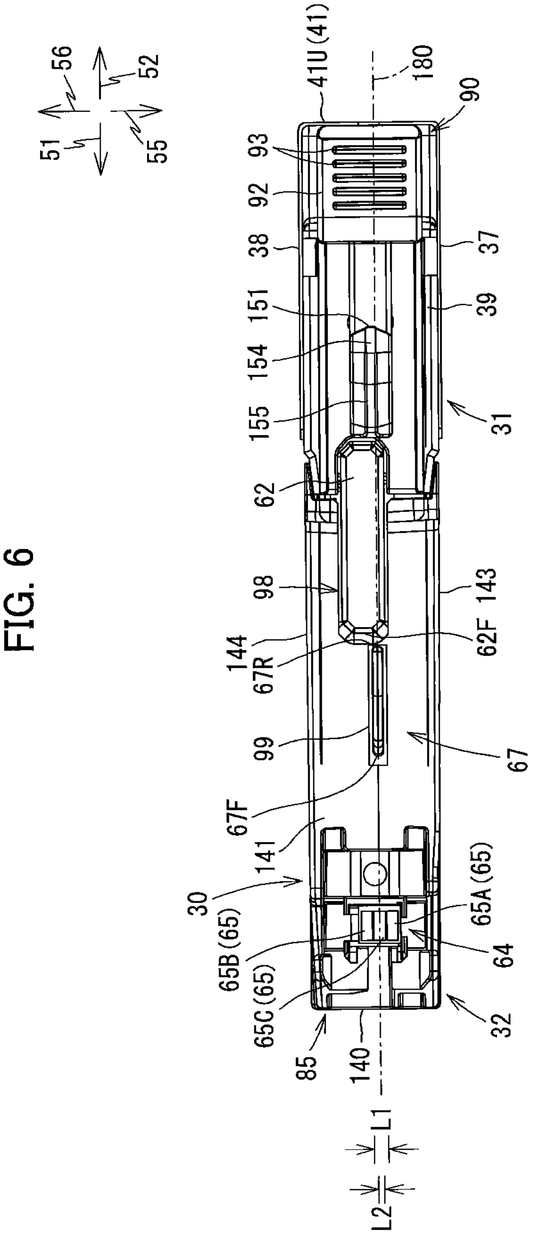
FIG. 6 is a top view of the ink cartridge.
Figure 7:
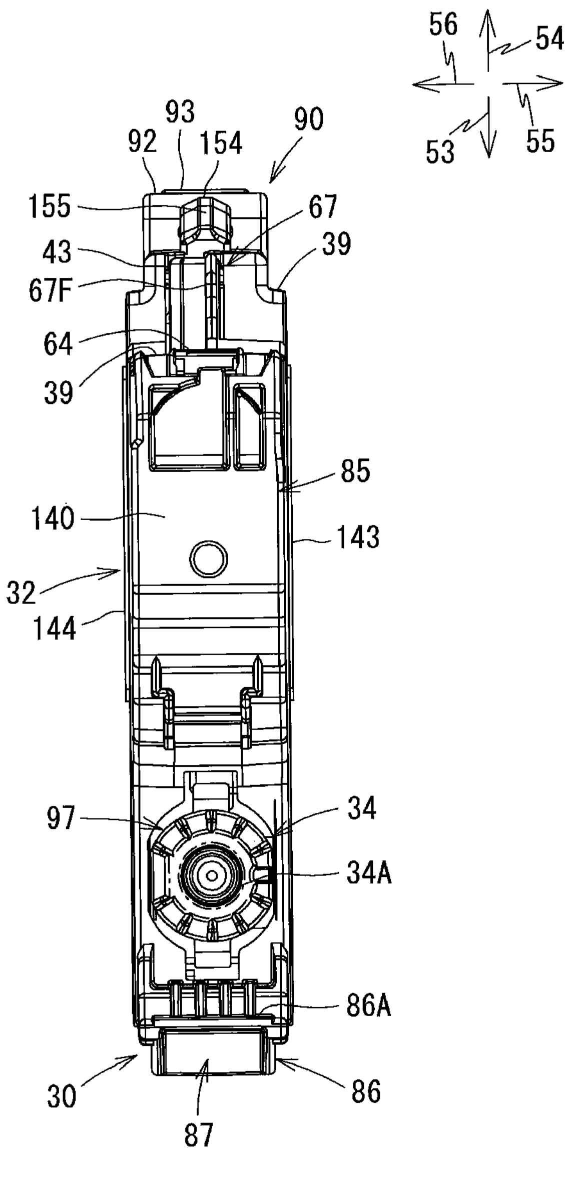
FIG. 7 is a front view of the ink cartridge.

As illustrated in FIGS. 6 and 8, the operation surface 92 is visible when the ink cartridge 30 is viewed from above and rearward thereof. The user operates the operation surface 92 in an attempt to remove the ink cartridge 30 attached to the cartridge-attachment section 110 therefrom. The operation portion 90 is fixed to the rear cover 31 so as not to move relative to the rear cover 31. For example, the operation portion 90 may be formed integrally with the rear cover 31 so as not to be pivotally moved relative thereto. Thus, a force applied from the user to the operation surface 92 is directly transmitted to the rear cover 31 without changing a direction of the force. In the present embodiment, the operation portion 90 is further configured not to make any movement relative to the inner frame 35 and the ink chamber 36. That is, the operation portion 90 is not pivotally movable relative to the inner frame 35 nor to the ink chamber 36.

<Front Cover 32>

As illustrated in FIGS. 3A to 4B, the front cover 32 includes the front wall 140, side walls 143 and 144, the top wall 141, and the bottom wall 142. The side walls 143 and 144 are spaced apart from each other in the left-right direction 55 and 56. The top wall 141 and the bottom wall 142 are spaced apart from each other in the up-down direction 53 and 54. The side walls 143 and 144, the top wall 141, and the bottom wall 142 extend rearward from the front wall 140. That is, the front cover 32 has a box shape formed with an opening that is open rearward. The inner frame 35 is inserted into the front cover 32 via this opening. That is, the front cover 32 covers a front portion of the inner frame 35 that is not covered by the rear cover 31.

In a state where the front cover 32 and the rear cover 31 are assembled to each other, that is, in a state where assembly of the ink cartridge 30 is completed, the top wall 141 of the front cover 32 and the top wall 39 of the rear cover 31 constitute a top wall of the ink cartridge 30; the bottom wall 142 of the front cover 32 and the bottom wall 42 of the rear cover 31 constitute a bottom wall of the ink cartridge 30; and the side walls 143 and 144 of the front cover 32 and the side walls 37 and 38 of the rear cover 31 respectively constitute the side walls of the ink cartridge 30.

Hence, in the assembled ink cartridge 30, a top surface of the top wall 141 and the top surface of the top wall 39 constitute a top surface of the ink cartridge 30; a bottom surface of the bottom wall 142 and a bottom surface of the bottom wall 42 constitute a bottom surface of the ink cartridge 30; and outer surfaces of the side walls 143 and 144 and outer surfaces of the side walls 37 and 38 constitute respective side surfaces of the ink cartridge 30.

In the attached posture of the ink cartridge 30, the bottom wall 142 of the front cover 32 extends in the front-rear direction 51 and 52, and the bottom wall 42 of the rear cover 31 is sloped to face downward and rearward.

Further, in the state where the ink cartridge 30 is assembled, the front wall 140 of the front cover 32 constitutes a front wall of the ink cartridge 30, whereas the rear wall 41 of the rear cover 31 constitutes a rear wall of the ink cartridge 30. The front wall of the ink cartridge 30 (the front wall 140 of the front cover 32) and the rear wall of the ink cartridge 30 (the rear wall 41 of the rear cover 31) are arranged to be spaced apart from each other in the front-rear direction 51 and 52. That is, in the attached posture, a front surface of the front wall 140 constitutes a front surface of the ink cartridge 30; and a rear surface of the rear wall 41 constitutes a rear surface of the ink cartridge 30.

Incidentally, the front surface, the rear surface, the top surface, the bottom surface, and the side surfaces constituting the ink cartridge 30 need not be configured as one flat plane, respectively. That is, the front surface of the ink cartridge 30 can be any surface(s) that can be seen when the ink cartridge 30 in its attached posture is viewed from its front side, and that is(are) positioned frontward relative to a center of the ink cartridge 30 in the front-rear direction 51 and 52. The rear surface of the ink cartridge 30 can be any surface(s) that can be seen when the ink cartridge 30 in its attached posture is viewed from its rear side, and that is(are) positioned rearward relative to the center of the ink cartridge 30 in the front-rear direction 51 and 52.

The top surface of the ink cartridge 30 can be any surface(s) that can be seen when the ink cartridge 30 in its attached posture is viewed from above, and that is(are) positioned upward relative to a center of the ink cartridge 30 in the up-down direction 53 and 54. The bottom surface of the ink cartridge 30 can be any surface(s) that can be seen when the ink cartridge 30 in its attached posture is viewed from below, and that is(are) positioned downward relative to the center of the ink cartridge 30 in the up-down direction 53 and 54. The same is applied to the side surfaces of the ink cartridge 30.

A through-hole 97 is formed in a lower end portion of the front wall 140 to penetrate the same in the front-rear direction 51 and 52. When the inner frame 35 is inserted in the front cover 32, the ink supply portion 34 provided at the inner frame 35 is exposed outside through the through-hole 97. Accordingly, the through-hole 97 is formed at a position, with a size and a shape corresponding to those of the ink supply portion 34 of the inner frame 35.

A first protruding portion 85 and a second protruding portion 86 are formed on the front surface of the front wall 140. The first protruding portion 85 protrudes frontward from an upper end portion of the front cover 32 to constitute an upper end portion of the front wall 140. The first protruding portion 85 has a front end constituting a part of the front surface of the front wall 140. A recess 96 is formed on the front end portion of the first protruding portion 85.

The second protruding portion 86 protrudes frontward from a lower end portion of the front cover 32 to constitute a lower end portion of the front wall 140. The second protruding portion 86 is positioned below the ink supply portion 34. The second protruding portion 86 has a front end 86A that is positioned frontward relative to a front end 34A of the ink supply portion 34. On a lower end portion of the front end 86A, a recess 87 is formed to open downward and frontward. A portion of the recess 87 protrudes further downward relative to the bottom surface of the bottom wall 142 of the front cover 32 (see FIG. 9).

Further, a through-hole 98 is formed in the top wall 141 of the front cover 32 (see FIGS. 3A, 4A and 6). The through-hole 98 penetrates the top wall 141 in the up-down direction 53 and 54. The through-hole 98 serves as a hole for exposing the detection portion 62 (described later) of the inner frame 35 to the outside in a state where the inner frame 35 is inserted in the front cover 32. Accordingly, the through-hole 98 is formed in the top wall 141 at a position, with a size and a shape, corresponding to those of the detection portion 62 of the inner frame 35.

A through-hole 99 is also formed in the top wall 141 of the front cover 32 to penetrate the top wall 141 in the up-down direction 53 and 54. When the inner frame 35 is inserted in the front cover 32, the through-hole 99 allows the light-blocking plate 67 of the inner frame 35 to be exposed to the outside therethrough. Accordingly, the through-hole 99 is formed in the top wall 141 so that a position, a size, and a shape of the through-hole 99 corresponds to those of the light-blocking plate 67 of the inner frame 35.

An IC board 64 is provided on the top surface of the top wall 141 at a position above the first protruding portion 85, i.e., above the ink supply portion 34. The IC board 64 is electrically connected to the corresponding three contacts 106 arranged in the left-right direction 55 and 56 during the insertion of the ink cartridge 30 into the cartridge-attachment section 110, as well as upon completion of the attachment of the ink cartridge 30 to the cartridge-attachment section 110.

On the IC board 64, an IC (not illustrated) and the electrode group 65 are mounted. The IC is a semiconductor integrated circuit and readably stores data indicating information on the ink cartridge 30, such as a lot number, a production date, and a color of the ink. The IC is mounted on a rigid substrate made of a glass epoxy, for example.

The electrode group 65 is formed on an upper surface of the rigid substrate so that the electrode group 65 is electrically accessible from the outside. The electrode group 65 is electrically connected to the IC and a power source. The electrode group 65 of the embodiment consists of the power-supply electrode 65A for power supply, the signal electrode 65B for exchanging signals, and the ground electrode 65C for grounding. Each of these electrodes 65A, 65B, and 65C faces upward and extends in the front-rear direction 51 and 52. The three electrodes 65A, 65B, and 65C are arranged to be spaced apart from each other in the left-right direction 55 and 56.

Among the three electrodes 65A, 65B, and 65C, the ground electrode 65C is positioned center in the left-right direction 55 and 56. That is, the ground electrode 65C is positioned between the power-supply electrode 65A and the signal electrode 65B in the left-right direction 55 and 56. Specifically, in the present embodiment, the power-supply electrode 65A is positioned on the right of the ground electrode 65C, and the signal electrode 65B is positioned on the left of the ground electrode 65C. However, the arrangement of the power-supply electrode 65A and the signal electrode 65B with respect to the ground electrode 65C may be interchangeable in the left-right direction 55 and 56. That is, the power-supply electrode 65A may be positioned on the left of the ground electrode 65C, and the signal electrode 65B may be positioned on the right of the ground electrode 65C. The power-supply electrode 65A and the signal electrode 65B are electrically connected to each other.

<Inner Frame 35>

Although not illustrated in the drawings, the inner frame 35 has a generally annular shape, with a pair of side surfaces in the left-right direction 55 and 56 opened. The respective open surfaces of the inner frame 35 are sealed with films (not illustrated) to form the ink chamber 36 for storing ink in the inner frame 35. The inner frame 35 includes a front wall 40 that faces the front wall 140 of the front cover 32 when the inner frame 35 is accommodated in the front cover 32. More specifically, a front surface of the front wall 40 faces a rear surface (opposite the front surface) of the front wall 140 when the inner frame 35 is accommodated in the front cover 32. The ink supply portion 34 is disposed at the front surface of the front wall 40.

The rear cover 31 is fixed to the inner frame 35. The front cover 32 is movable in the front-rear direction 51 and 52 and the up-down direction 53 and 54 relative to the inner frame 35.

As illustrated in FIGS. 3A to 5, openings 115 are formed in the respective side walls 143 and 144 of the front cover 32. The inner frame 35 includes protrusions 116 each at a position corresponding to one of the openings 115. The protrusions 116 protrude outward in the left-right direction 55 and 56 so that the protrusions 116 are received in the respective openings 115. Each of the openings 115 has dimensions in the front-rear direction 51 and 52 and in the up-down direction 53 and 54 greater than dimensions of the corresponding protrusion 116 in the front-rear direction 51 and 52 and in the up-down direction 53 and 54, respectively. Since the protrusions 116 are moved inside the corresponding openings 115 in the front-rear direction 51 and 52, the front cover 32 is movable in the front-rear direction 51 and 52 relative to the inner frame 35. Further, the front cover 32 is movable in the up-down direction 53 and 54 relative to the inner frame 35, since the protrusions 116 are moved inside the corresponding openings 115 in the up-down direction 53 and 54.

<Ink Supply Portion 34>

Figure 9:
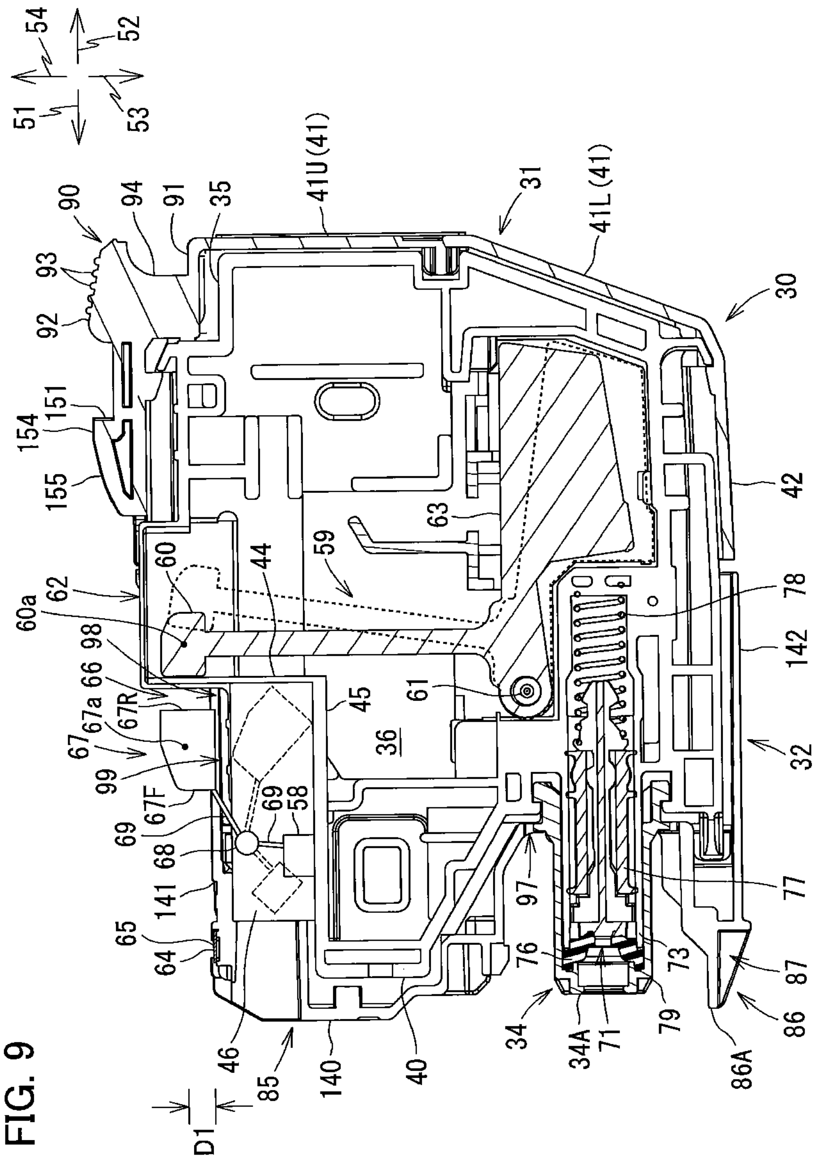
FIG. 9 is a vertical cross-sectional view illustrating an internal configuration of the ink cartridge.

As illustrated in FIG. 9, the ink supply portion 34 protrudes frontward from the front wall 40 of the inner frame 35. The ink supply portion 34 has a cylindrical outer shape, and extends in the front-rear direction 51 and 52. The ink supply portion 34 protrudes outward (frontward) through the through-hole 97 formed in the front wall 140 of the front cover 32 in the state where the inner frame 35 is accommodated in the front cover 32. That is, the ink supply portion 34 is positioned at a lower end portion of the front wall 140. The ink supply portion 34 includes a cylindrical-shaped tubular wall 73 defining an internal space therein, a sealing member 76, and a cap 79. The sealing member 76 and the cap 79 are attached to the tubular wall 73.

The tubular wall 73 extends to connect the interior and exterior of the ink chamber 36. The tubular wall 73 has a rear end that is open in the ink chamber 36, and a front end that is open to the outside of the ink cartridge 30. Accordingly, the tubular wall 73 provides fluid communication between the ink chamber 36 and the outside of the ink cartridge 30 through the internal space of the tubular wall 73. The ink supply portion 34 can thus supply the ink stored in the ink chamber 36 to the outside of the ink cartridge 30 via the internal space of the tubular wall 73. The sealing member 76 and the cap 79 are attached to the front end of the tubular wall 73.

In the internal space of the tubular wall 73, a valve 77 and the coil spring 78 are accommodated. The valve 77 and the coil spring 78 serve to selectively switch states of the ink supply portion 34 between a state illustrated in FIG. 12 and a state illustrated in FIG. 9. That is, in the state illustrated in FIG. 12, the ink is allowed to flow out of the ink chamber 36 to the outside of the ink cartridge 30 via the internal space of the tubular wall 73. In the state illustrated in FIG. 9, the ink is not allowed to flow out of the internal space of the tubular wall 73 to the outside of the ink cartridge 30.

The valve 77 is movable in the front-rear direction 51 and 52 to open and close the ink supply port 71 formed at a center of the sealing member 76. The coil spring 78 urges the valve 77 frontward. Accordingly, without application of an external force, the valve 77 closes off the ink supply port 71 of the sealing member 76.

As described above, the sealing member 76 is provided at the front end of the tubular wall 73. The sealing member 76 is formed of an elastic material such as rubber or elastomer. The sealing member 76 is disc-like shaped and has a center portion in which a through-hole is formed. The through-hole penetrates the center portion of the sealing member 76 in the front-rear direction 51 and 52 to provide a tubular-shaped inner circumferential surface that defines the ink supply port 71. The ink supply port 71 has a diameter that is slightly smaller than an outer diameter of the ink needle 102. The cap 79 is externally fitted to the tubular wall 73, with the sealing member 76 attached to the front end of the tubular wall 73, so that the sealing member 76 is in liquid-tight contact with the front end of the tubular wall 73.

As the ink cartridge 30 is inserted into the cartridge-attachment section 110 in a state where the valve 77 closes the ink supply port 71, the ink needle 102 enters the ink supply port 71. An outer circumferential surface of the ink needle 102 is brought into contact with the inner circumferential surface of the sealing member 76 that defines the ink supply port 71 to provide a liquid-tight seal therewith, while elastically deforming the sealing member 76. When a tip end portion of the ink needle 102 is moved past the sealing member 76 and enters the internal space of the tubular wall 73, the ink needle 102 comes in contact with the valve 77. As the ink cartridge 30 is further inserted into the cartridge-attachment section 110, the ink needle 102 moves the valve 77 rearward against the urging force of the coil spring 78. Accordingly, the ink stored in the ink chamber 36 can flow into the tip end portion of the ink needle 102 via the internal space of the tubular wall 73.

Although not illustrated in the drawings, through-holes are formed in the tip end portion of the ink needle 102. Through these through-holes of the ink needle 102, the ink is allowed to flow from the internal space of the tubular wall 73 into an internal space of the ink needle 102. In this way, the ink stored in the ink chamber 36 can flow outside the ink cartridge 30 through the internal spaces of the tubular wall 73 and the ink needle 102.

Incidentally, the ink supply portion 34 may not be provided with the valve 77 for closing the ink supply port 71. Instead, for example, the ink supply port 71 may be closed with a film. In this case, the ink needle 102 may break through the film at the time of insertion of the ink cartridge 30 into the cartridge-attachment section 110, thereby allowing the tip end portion of the ink needle 102 to enter the internal space of the tubular wall 73 through the ink supply port 71. Still alternatively, the ink supply port 71 may be closed with an elastic force of the sealing member 76 itself. In this case, the ink supply port 71 may be pushed and enlarged by the ink needle 102 only when the ink needle 102 is inserted in the ink supply port 71.

<Detection Portion 62>

As illustrated in FIG. 9, the detection portion 62 is provided on a top surface of the inner frame 35 to protrude upward therefrom. The detection portion 62 is exposed to the outside through the through-hole 98 formed in the front cover 32 such that the detection portion 62 protrudes upward relative to the top wall 141 of the front cover 32. The detection portion 62 defines an internal space therein that is in communication with the ink chamber 36. The detection portion 62 can allow light to pass therethrough in the left-right direction 55 and 56. That is, the detection portion 62 has light-transmissive properties.

A detection member 59 is disposed inside the ink chamber 36 of the inner frame 35.

The detection member 59 is supported by a pivot shaft 61 extending in the left-right direction 55 and 56 so as to be pivotably movable about the pivot shaft 61. The detection member 59 includes a float 63, and a light-blocking plate 60.

The float 63 has a specific gravity smaller than a specific gravity of the ink stored in the ink chamber 36. Accordingly, in the ink chamber 36, buoyancy is generated on the float 63 as long as the float 63 is in the ink. In other words, in a state where the ink chamber 36 is almost filled with the ink, the detection member 59 is urged to be pivotally moved counterclockwise in FIG. 9 due to the buoyancy generated on the float 63.

The light-blocking plate 60 is plate-shaped and is disposed inside the detection portion 62 of the inner frame 35. Since the detection member 59 is urged to be pivotally moved counterclockwise in FIG. 9, the light-blocking plate 60 is in contact with a wall defining a front edge 62F of the detection portion 62. Due to this contact, the detection member 59 is maintained in a posture indicated by a solid line in FIG. 9. In this posture of the detection member 59, the light-blocking plate 60 is at a first position where the light-blocking plate 60 blocks the light from the sensor 103 traveling in the left-right direction 55 and 56 through the detection portion 62. At the first position, the light-blocking plate 60 is located higher relative to the top wall 141 of the front cover 32.

A detecting position 60*a* at which light from the sensor 103 is incident on and blocked by the light-blocking plate 60 at the first position (i.e., a position of an optical path formed by the light from the sensor 103) is away from the electrode group 65 of the IC board 64 by a first distance D1 in the upward direction 54.

More specifically, when the light emitted from the light-emitting element of the sensor 103 is incident on the light-blocking plate 60 (a side surface thereof) before arriving at the light-receiving element, the intensity of the light received at the light-receiving element is less than a predetermined intensity, for example, zero. Note that the light-blocking plate 60 may completely block the light traveling in the left-right direction 55 and 56, or may partially attenuate the light, or may totally reflect the light.

When the amount of ink decreases in the ink chamber 36 and a liquid surface of the ink becomes lower than the position of the float 63 depicted in FIG. 9 (the position of the float 63 when the detection member 59 is in the posture indicated by the solid line FIG. 9 to provide the light-blocking plate 60 at the first position), the float 63 starts to be moved downward, following the declining liquid surface of the ink. In accordance with the downward movement of the float 63, the detection member 59 is pivotally moved clockwise in FIG. 9 to become a posture indicated by a broken line in FIG. 9, thereby causing the light-blocking plate 60 located inside the detection portion 62 (at the first position) to be moved downward to a second position where the light-blocking plate 60 is out of an optical path formed by the light traveling from the light-emitting element to the light-receiving element of the sensor 103 (i.e., the light emitted from the sensor 103 is not incident on the detecting position 60*a*). Accordingly, the intensity of the light received at the light-receiving element of the sensor 103 is equal to or greater than the predetermined intensity when the light-blocking plate 60 is at the second position.

As illustrated in FIG. 9, the inner frame 35 also includes walls 44 and 45, and side walls 46 those define a space at a position frontward of the detection portion 62. A shaft 68 extending in the left-right direction 55 and 56 is disposed within the space. The shaft 68 has both ends in the left-right direction respectively supported by the side walls 46 positioned leftward and rightward of the walls 44 and 45.

Two arms 69 extending in directions different from each other are movably connected to the shaft 68. One of the arms 69 that extends rearward from the shaft 68 has a distal end connected to the light-blocking plate 67. The light-blocking plate 67 extends in the front-rear direction 51 and 52, and protrudes upward from the top wall 141 through the through-hole 99 formed in the front cover 32. The light-blocking plate 67 is positioned frontward of the detection portion 62. As will be described below in detail, the light-blocking plate 67 is pivotally movable between a first posture and a second posture about an axis extending in the left-right direction 55 and 56.

A weight 58 is connected to a distal end of the remaining one of the arms 69 that extends frontward from the shaft 68. The weight 58 has a weight greater than that of the light-blocking plate 67. As the weight 58 comes into contact with the wall 45, the light-blocking plate 67 is moved to change its posture to the first posture (indicated by a solid line in FIG. 9) where an upper edge of the light-blocking plate 67 is positioned above the detecting position 60*a* of the light-blocking plate 60 on which the light from the sensor 103 is incident (i.e., the position of the optical path). That is, a portion of the light-blocking plate 67 in the first posture is positioned upward relative to the light-blocking plate 60. In this state, the one of the arms 69 extends upward and rearward from the shaft 68, whereas the remaining one of the arms 69 extends downward from the shaft 68.

When an external force directed rearward is applied to the light-blocking plate 67, the light-blocking plate 67 is pivotally moved clockwise in FIG. 9 about the shaft 68 (an axis of the shaft 68), and the weight 58 is moved away from the wall 45. As a result, the light-blocking plate 67 changes its posture to the second posture (indicated by a broken line in FIG. 9) where the upper edge of the light-blocking plate 67 is positioned below the detecting position 60*a* of the light-blocking plate 60 on which the light from the sensor 103 is incident. That is, a portion of the light-blocking plate 67 in the second posture is positioned downward relative to the light-blocking plate 60. The one of the arms 69 extends substantially rearward from the shaft 68 and the remaining one of the arms 69 extends frontward and rearward from the shaft 68 when the light-blocking plate 67 is in the second posture.

When an external force is no longer applied to the light-blocking plate 67 in the second posture, the light-blocking plate 67 is pivotally moved back counterclockwise in FIG. 9 about the shaft 68 (the axis of the shaft 68) to become the first posture.

When the light-blocking plate 67 is in the first posture, a space 66 extending in the front-rear direction 51 and 52 are defined between a rear edge 67R of the light-blocking plate 67 in the first posture and the front edge 62F of the detection portion 62. In other words, the light-blocking plate 67 in the first posture and the detection portion 62 are arranged in the front-rear direction 51 and 52 via the space 66. The space 66 is continuous in the left-right direction 55 and 56. The space 66 has a light transmittance greater than a light transmittance of the light-blocking plate 67.

The light-blocking plate 67 in the first posture is positioned rearward and upward of the electrode group 65 of the IC board 64. The upper edge of the light-blocking plate 67 in the first posture is positioned between left and right edges of the detection portion 62 in the left-right direction 55 and 56. The upper edge of the light-blocking plate 67 in the second posture is positioned downward of the electrode group 65 of the IC board 64.

When in the first posture, the light-blocking plate 67 blocks the light outputted from the sensor 103 and traveling in the left-right direction 55 and 56. A detecting position 67*a* at which the light from the sensor 103 is incident on and blocked by the light-blocking plate 67 in the first posture (i.e., a position of an optical path of the sensor 103) is positioned apart from the electrode group 65 of the IC board 64 by the first distance D1 in the upward direction 54. More specifically, as the light emitted from the light-emitting element of the sensor 103 is incident on the light-blocking plate 67 before reaching the light-receiving element, the intensity of light received at the light-receiving element is less than a predetermined intensity, for example, zero. Note that the light-blocking plate 67 may completely block the light traveling in the left-right direction 55 and 56, or may partially attenuate the light, may refract the light to change a traveling direction thereof, or may fully reflect the light. When the light-blocking plate 67 partially blocks or attenuate light, a portion of the light-blocking plate 67 serves as a light-blocking portion.

<Arrangement of Detection Portion 62, Electrode Group 65, and Light-Blocking Plate 67>

As illustrated in FIG. 6, the detection portion 62, the IC board 64, and the light-blocking plate 67 are positioned at the top surface of the top wall 141 of the front cover 32. To be precise, the detection portion 62 penetrates the through-hole 98 of the top wall 141 of the front cover 32 to protrude upward relative to the top surface of the top wall 141. In the present disclosure, this structure of the detection portion 62 relative to the top wall 141 will be defined as a state where the detection portion 62 is provided at the top wall 141.

Further, when in the first posture, the light-blocking plate 67 penetrates the through-hole 99 of the front cover 32 to protrude upward relative to the top wall 141. This configuration will also be defined as a state where the light-blocking plate 67 in the first posture is provided at the top wall 141 in the present disclosure.

Referring to FIG. 6, the light-blocking plate 67 in the first posture and the ground electrode 65C are arranged at the top wall 141 of the front cover 32 such that the light-blocking plate 67 in the first posture and the ground electrode 65C are positioned on an imaginary plane 180 which is indicated by a phantom line in FIG. 6. The imaginary plane 180 extends in parallel to the front-rear direction 51 and 52 and the up-down direction 53 and 54. The imaginary plane 180 passes through a center in the left-right direction 55 and 56 of the front cover 32 and passes through a center in the left-right direction 55 and 56 of the light-blocking plate 67 in the first posture. Accordingly, the center in the left-right direction 55 and 56 of the light-blocking plate 67 in the first posture is coincident with the center in the left-right direction 55 and 56 of the front cover 32.

A center in the left-right direction 55 and 56 of the ground electrode 65C is also positioned on the imaginary plane 180. The ground electrode 65C has a width L1 in the left-right direction 55 and 56 greater than a width L2 in the left-right direction 55 and 56 of the top surface of the light-blocking plate 67 in the first posture (L1>L2).

<Attachment/Detachment of Ink Cartridge 30 relative to/from Cartridge-Attachment Section 110>

Next, a process for attaching the ink cartridge 30 to the cartridge-attachment section 110 will be described.

As illustrated in FIG. 9, in the ink cartridge 30 before insertion thereof into the cartridge-attachment section 110, the valve 77 closes off the ink supply port 71 of the sealing member 76. Accordingly, at this time, ink flow from the ink chamber 36 to the outside of the ink cartridge 30 is interrupted.

Also, prior to attachment of the ink cartridge 30 to the cartridge-attachment section 110, nothing is located between the light-emitting element and the light-receiving element of the sensor 103. The sensor 103 therefore outputs a high-level signal to the controller 130 of the printer 10. At this time, a cover (not illustrated) of the printer 10 is opened by a user, so that the opening 112 of the cartridge-attachment section 110 is exposed to the outside.

For attaching the ink cartridge 30 to the cartridge-attachment section 110, the ink cartridge 30 is inserted frontward into the case 101 of the cartridge-attachment section 110 through the opening 112, as illustrated in FIG. 10. Since the upper portion 41U of the rear wall 41 of the rear cover 31 is positioned rearward relative to the lower portion 41L of the rear wall 41, that is, since the upper portion 41U is positioned closer to the user than the lower portion 41L is to the user, the user can push the upper portion 41U to insert the ink cartridge 30 frontward into the cartridge-attachment section 110.

At the time of insertion of the ink cartridge 30 into the case 101 of the cartridge-attachment section 110, a lower portion of the ink cartridge 30, that is, lower portions of the front cover 32 and the rear cover 31, are inserted into the corresponding lower guide groove 109 formed in the bottom wall of the case 101.

As the ink cartridge 30 is inserted further frontward, the light-blocking plate 67 in the first posture comes to a location between the light-emitting element and the light-receiving element of the sensor 103. When a front edge 67F of the light-blocking plate 67 in the first posture is moved past the optical path of the sensor 103, the sensor 103 outputs a low-level signal, instead of the high-level signal, to the controller 130 of the printer 10. That is, the signal outputted from the sensor 103 is changed from high level to low level.

As illustrated in FIG. 11, as the ink cartridge 30 is inserted further frontward, the space 66 comes to the location between the light-emitting element and the light-receiving element of the sensor 103. When the rear edge 67R of the light-blocking plate 67 the light-blocking plate 67 in the first posture is moved past the optical path of the sensor 103, the sensor 103 outputs a high-level signal, instead of the low-level signal, to the controller 130 of the printer 10. That is, the signal outputted from the sensor 103 is changed from low level to high level.

Further, as illustrated in FIG. 11, in accordance with the frontward movement of the ink cartridge 30 into the cartridge-attachment section 110, the cap 79 of the ink supply portion 34 starts entering the guide portion 105. As the cap 79 of the ink supply portion 34 enters the guide portion 105 and the ink needle 102 is moved past the ink supply port 71, the valve 77 is separated from the sealing member 76 against the urging force of the coil spring 78. The ink supply portion 34 is thus fixed in position relative to the cartridge-attachment section 110. The ink cartridge 30 is applied with the urging force of the coil spring 78 to be urged rearward.

Further, at this time, a bottom surface 85A of the first protruding portion 85 is supported by a surface 170 constituting the case 101 of the cartridge-attachment section 110, the surface 170 facing upward and being positioned above the corresponding guide portion 105 (also see FIG. 2). Due to this contact between the bottom surface 85A and the surface 170, the ink cartridge 30 is fixed in position in the up-down direction 53 and 54. Incidentally, the bottom surface 85A is arranged to overlap with the IC board 64 when the ink cartridge 30 is viewed from above.

Further, the light-blocking plate 67 in the first posture, that has moved past the location between the light-emitting element and the light-receiving element of the sensor 103 and advances frontward, begins to enter the slit 108.

Also, at this time, the IC board 64 arrives at a position below the contacts 106. The respective electrodes 65A to 65C of the electrode group 65 on the IC board 64 are thus electrically connected to the corresponding contacts 106 while resiliently deforming the contacts 106 upwardly.

Further, in the state illustrated in FIG. 11, the protrusion 43 of the rear cover 31 arrives at the locking portion 145 of the cartridge-attachment section 110. The sloped surface 155 of the protrusion 43 is moved frontward while making sliding contact with the locking portion 145, as the ink cartridge 30 is moved frontward. This contact between the sloped surface 155 and the locking portion 145 causes the ink cartridge 30 to be pivotally moved clockwise in FIG. 11 against a counterclockwise rotational moment that is applied to the ink cartridge 30 as a result of user's pushing of the upper portion 41U. Specifically, the ink cartridge 30 is pivotally moved clockwise in FIG. 11 about a center of the ink supply port 71 of the sealing member 76 in which the ink needle 102 is inserted, that is, about a center of a portion of the outer circumferential surface of the ink needle 102, the portion being in contact with the inner circumferential surface defining the ink supply port 71.

Since the bottom wall 42 of the rear cover 31 is sloped relative to the front-rear direction 51 and 52, a space is available between the bottom wall 42 and the bottom wall of the cartridge-attachment section 110. This space between the bottom wall 42 and the bottom wall of the cartridge-attachment section 110 enables the ink cartridge 30 to make the above-described pivotal movement (the pivotal movement in a clockwise direction in FIG. 11).

As the ink cartridge 30 is inserted further frontward against the urging force of the coil spring 78 from the state illustrated in FIG. 11, the sloped surface 155 and the horizontal surface 154 come to a location frontward of the locking portion 145, i.e., closer to the end wall of the case 101 than the locking portion 145 is to the end wall. Since the sloped surface 155 and the horizontal surface 154 are now separated from the locking portion 145, the ink cartridge 30 is pivoted counterclockwise (upward) in FIG. 12 about the center of the ink supply port 71 due to the counterclockwise rotational moment applied to the ink cartridge 30 by the user's frontward pushing of the upper portion 41U of the ink cartridge 30.

As a result, the locking surface 151 of the protrusion 43 now faces the locking portion 145 rearward. When the user stops pushing the ink cartridge 30 frontward at this time, the ink cartridge 30 is moved rearward by the urging force of the coil spring 78. In response to the rearward movement of the ink cartridge 30, the locking surface 151 comes into contact with the locking portion 145 from frontward thereof. As a result of this contact of the locking surface 151 with the locking portion 145, the ink cartridge 30 is restricted from moving further rearward in the cartridge-attachment section 110 to complete the attachment of the ink cartridge 30 to the cartridge-attachment section 110. The ink cartridge 30 is thus fixed in position relative to the cartridge-attachment section 110. In the attached state of the ink cartridge 30, the detection portion 62 (and the light-blocking plate 60) is positioned on the optical path of the sensor 103. Further, the light-blocking plate 67 is positioned within the corresponding slit 108.

Figure 13:
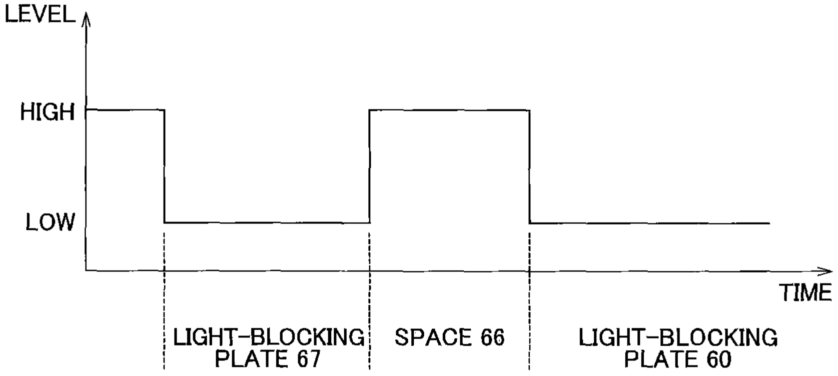
FIG. 13 is a timing chart illustrating signals outputted from the sensor during an attachment process.

Referring to FIG. 13, the controller 130 is configured to determine whether the ink cartridge 30 is attached to the cartridge-attachment section 110 based on fluctuations in the signal outputted from the sensor 103 during the insertion of the ink cartridge 30 into the cartridge-attachment section 110.

Specifically, the controller 130 determines that a normal ink cartridge 30 is attached to the cartridge-attachment section 110 when the signal outputted from the sensor 103 changes: from high level to low level by the light-blocking plate 67 in the first posture; then from low level to high level upon passage of the space 66; and from high level to low level again by the light-blocking plate 60 inside the detection portion 62. Here, the ink cartridge 30 is defined as being "normal" when: the ink cartridge 30 can be used in the printer 10; and a sufficient amount of ink (greater than an amount of ink to be determined as empty or near empty) is stored in the ink chamber 36 of the ink cartridge 30.

When the signal outputted from the sensor 103 fluctuates in a different way from that illustrated in FIG. 13, the controller 130 determines that an abnormal ink cartridge 30 is attached to the cartridge-attachment section 110. If this is the case, the controller 130 notifies the user that the attached ink cartridge 30 is abnormal through an error message on a display, for example.

Alternatively, the controller 130 may be configured to make a determination as to whether the ink cartridge 30 is attached to the cartridge-attachment section 110 in the following way. A cover sensor may be provided in the printer 10 to output a signal to the controller 130 when detecting that the opening 112 of the cartridge-attachment section 110 is closed by the cover. The controller 130 may start an electrical access to the IC board 64 upon receipt of the signal from the cover sensor. The controller 130 may determine that the (normal) ink cartridge 30 is attached to the cartridge-attachment section 110 upon detecting that: accessing to the information (reading) stored in the IC board 64 can be performed normally; and/or electrical connection to the IC board 64 can be established.

Next, a process for detaching the ink cartridge 30 from the cartridge-attachment section 110 will be described.

For detaching the ink cartridge 30 from the cartridge-attachment section 110, the user pushes the operation surface 92 of the ink cartridge 30 downward. In the attached posture of the ink cartridge 30 to the cartridge-attachment section 110 illustrated in FIG. 12, the operation surface 92 faces upward and rearward. Hence, when the user operates the operation surface 92 of the ink cartridge 30 fixed in position in the cartridge-attachment section 110 (in the attached state), the ink cartridge 30 is applied with a force acting downward and frontward. By the frontward force, the locking surface 151 is disengaged from the locking portion 145 of the cartridge-attachment section 110. By the downward force, the ink cartridge 30 is pivotally moved clockwise in FIG. 12.

Figure 12:
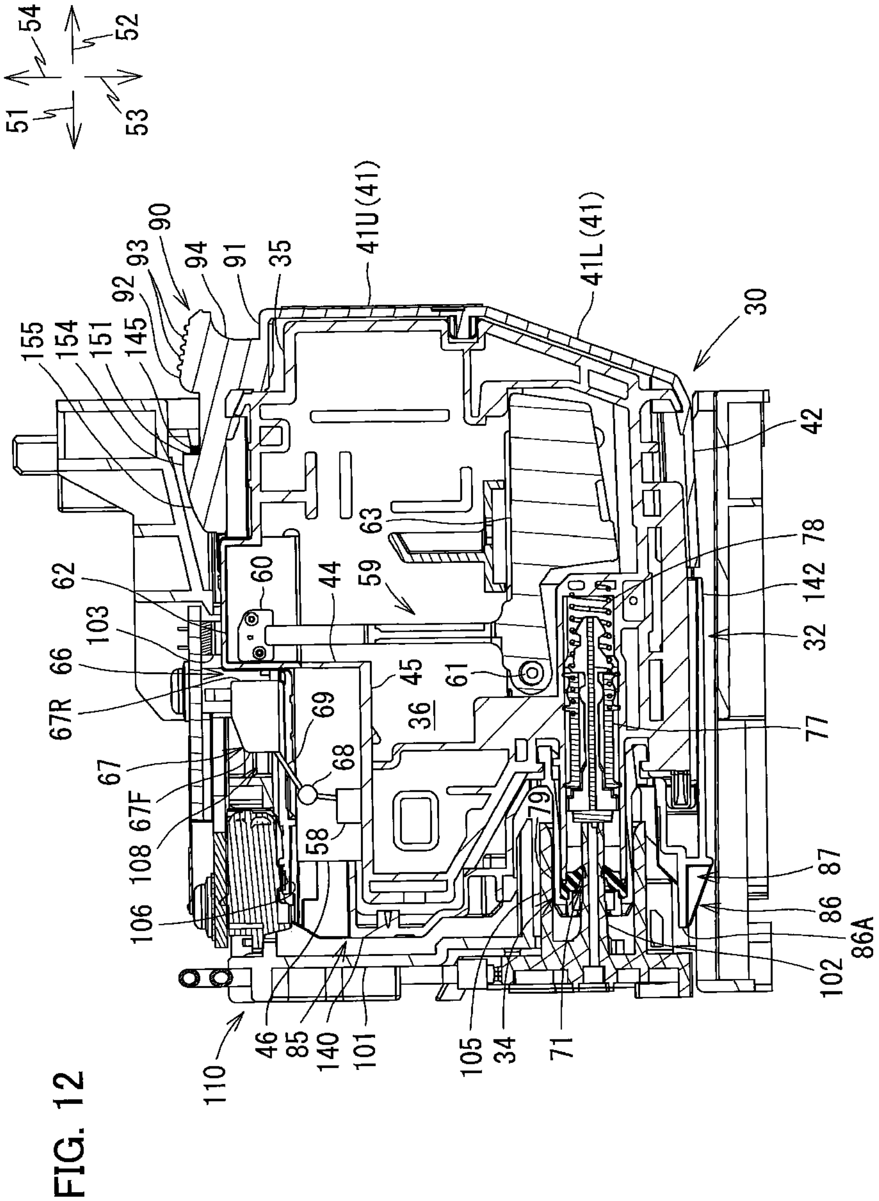
FIG. 12 is a vertical cross-sectional view of the ink cartridge and the cartridge-attachment section, and illustrating a state where the ink cartridge is fixed in position relative to the cartridge-attachment section.

By this pivotal movement of the ink cartridge 30 in the clockwise direction in FIG. 12, the locking surface 151 is moved downward below the locking portion 145. The ink cartridge 30 is then caused to be moved rearward, relative to the cartridge-attachment section 110, due to the rearward urging force of the coil spring 78. The user can now grasp the rear cover 31 of the ink cartridge 30 to pull the same rearward, thereby removing the ink cartridge 30 from the cartridge-attachment section 110.

In accordance with the rearward movement of the ink cartridge 30 for removal, the space 66 and the light-blocking plate 67 in the first posture are also moved rearward to be displaced from the optical path of the sensor 103. The signal outputted from the sensor 103 to the controller 130 thus changes from high level to low level, and then from low level to high level, in accordance with the rearward movement of the space 66 and the light-blocking plate 67.

The change in signal of the sensor 103 caused by detection of the front edge 67F and the rear edge 67R of the light-blocking plate 67 may be utilized to determine whether the ink cartridge 30 is attached to the cartridge-attachment section 110, as well as to identify the kind of the ink cartridge 30 attached to the cartridge-attachment section 110 (for example, the color of ink stored in the attached ink cartridge 30).

<Pivotal Movement of Light-Blocking Plate 67>

During the insertion of the ink cartridge 30 into the cartridge-attachment section 110, the light-blocking plate 67 in the first posture may contact the wall surface 107 (see FIG. 2) where the slit 108 is open without entering the slit 108, if the upper end portion and the lower end portion of the ink cartridge 30 are inserted into the corresponding guides groove 109 of the case 101 in a state where the ink cartridge 30 is tilted relative to the case 101.

As illustrated in FIG. 14, when the ink cartridge 30 is moved frontward while the light-blocking plate 67 in the first posture does not enter the slit 108 but contacts the wall surface 107, the light-blocking plate 67 in the first posture is relatively pressed rearward by the wall surface 107, whereby the light-blocking plate 67 is pivotally moved clockwise in FIG. 14 about the shaft 68 to become from the first posture to the second posture. Since the light-blocking plate 67 in the second posture is positioned below the through-hole 99 of the front cover 32, the ink cartridge 30 can be attached to the cartridge-attachment section 110 without entry of the light-blocking plate 67 into the slit 108.

Technical Advantages of Embodiment

According to the present embodiment, the light-blocking plate 67 in the first posture, the space 66, and the detection portion 62 can be detected by the sensor 103. Also, when the ink cartridge 30 is attached to the cartridge-attachment section 110, or the ink cartridge 30 is dropped onto a floor and the like and impact is imparted on the ink cartridge 30, the light-blocking plate 67 is pivotally moved toward the second posture. Accordingly, the light-blocking plate 67 is hard to get damaged.

In the ink cartridge 30 according to the above-described embodiment, the light-blocking plate 67 and the ground electrode 65C are arranged to cross the single imaginary plane 180. With this configuration, since the ground electrode 65C is at the same widthwise position with the light-blocking plate 67 in the left-right direction 55 and 56, the ground electrode 65C is hard to interfere with the sensor 103 (which is configured to detect the light-blocking plate 67) during the insertion of the ink cartridge 30 into the cartridge-attachment section 110. Further, even if the ink cartridge 30 is inserted into the cartridge-attachment section 110 in a posture inclined laterally relative to the front-rear direction 51 and 52 (or, even if the ink cartridge 30 is inserted in a posture pivotally moved in the left-right direction 55 and 56 about the ink supply port 71 of the ink supply portion 34), the ground electrode 65C, which has been once in contact with the corresponding contact 106, is less likely to be separated therefrom since the ground electrode 65C is positioned at the widthwise center of the top wall 141. Hence, the electrical connection between the ground electrode 65C and the contact 106 corresponding thereto can be stably maintained.

Further, even if the ink cartridge 30 is inserted into the cartridge-attachment section 110 in a posture inclined laterally relative to the front-rear direction 51 and 52 (or, even if the ink cartridge 30 is inserted in a posture pivotally moved in the left-right direction 55 and 56 about the ink supply port 71 of the ink supply portion 34), positions of the front edge 67F and the rear edge 67R of the light-blocking plate 67 are less likely to be displaced with respect to the front-rear direction 51 and 52.

In the ink cartridge 30 according to the present embodiment, the space 66 is provided between the light-blocking plate 67 and the detection portion 62 in the front-rear direction 51 and 52. This configuration can facilitate the optical detection of the rear edge 67R of the light-blocking plate 67 by the sensor 103. Further, in the signal output of the sensor 103, the optical detection of the light-blocking plate 67 and the optical detection of the detection portion 62 (the light-blocking plate 60) are explicitly distinguishable from each other. Further, the light-blocking plate 67 and the detection portion 62 (the light-blocking plate 60) can be arranged generally at the same height as each other and, hence, can be optically detected by the single sensor 103 during the insertion of the ink cartridge 30 into the cartridge-attachment section 110.

Further, the width L1 in the left-right direction 55 and 56 of the ground electrode 65C is greater than the width L2 in the left-right direction 55 and 56 of the top surface of the light-blocking plate 67 on the top surface of the ink cartridge 30, as illustrated in FIG. 6. With this configuration, even if the ink cartridge 30 is inserted into the cartridge-attachment section 110 in a posture inclined laterally relative to the front-rear direction 51 and 52 (or, even if the ink cartridge 30 is inserted in a posture pivotally moved in the left-right direction 55 and 56 about the ink supply port 71 of the ink supply portion 34), the electrical connection between the ground electrode 65C and the corresponding contact 106 can be maintained stably, and interference between the light-blocking plate 67 and the sensor 103 is less likely to occur.

<Variations and Modifications>

Figure 15A:
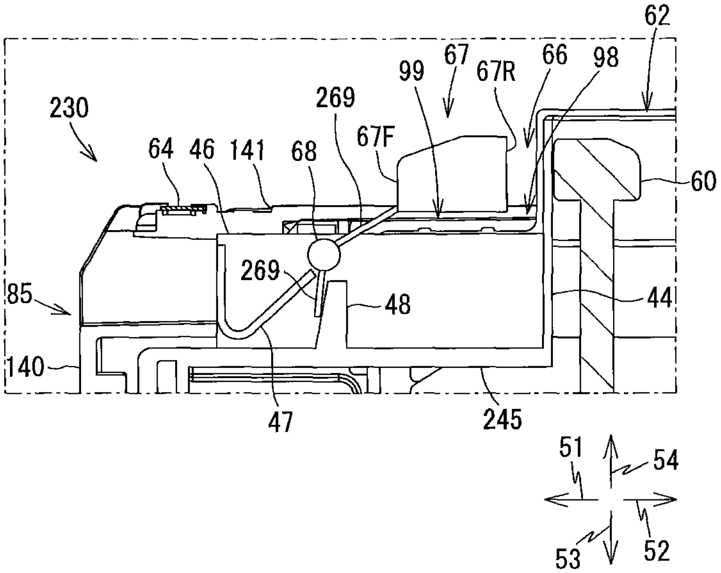
FIG. 15A is an enlarged view illustrating a state where the light-blocking plate is urged by a leaf spring to be in its first posture.
Figure 15B:
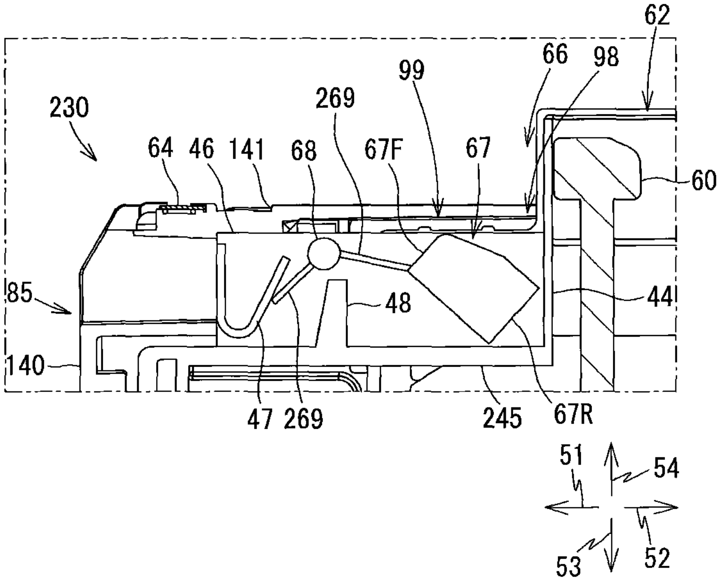
FIG. 15B is an enlarged view illustrating a state where the light-blocking plate is in its second posture against an urging force of the leaf spring.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the weight 58 is connected to the light-blocking plate 67 through the two arms 69 in the above-described embodiment, the weight 58 may be dispensed with. For example, FIGS. 15A and 15B illustrates a first modification to the embodiment in which an ink cartridge 230 includes two arms 269 in place of the arms 69, and a leaf spring 47 in place of the weight 58. The leaf spring 47 is provided frontward of one of the arms 269 that extends downward from the shaft 68. The leaf spring 47 is in abutment on the arm 269 to urge the same counterclockwise in FIG. 14.

As illustrated in FIG. 15A, the arm 269 urged by the leaf spring 47 is brought into contact with a stopper 48 provided on a wall 245, thereby maintaining the light-blocking plate 67 in a pivot position serving as the first posture. That is, the leaf spring 47 urges the light-blocking plate 67 toward the first posture. When an external force directed rearward is applied to the light-blocking plate 67, the light-blocking plate 67 is pivotally moved clockwise against an urging force of the leaf spring 47 and the arms 269 cause the leaf spring 47 to be deformed. As a result, the light-blocking plate 67 becomes the second posture as illustrate in FIG. 15B.

Figure 16A:
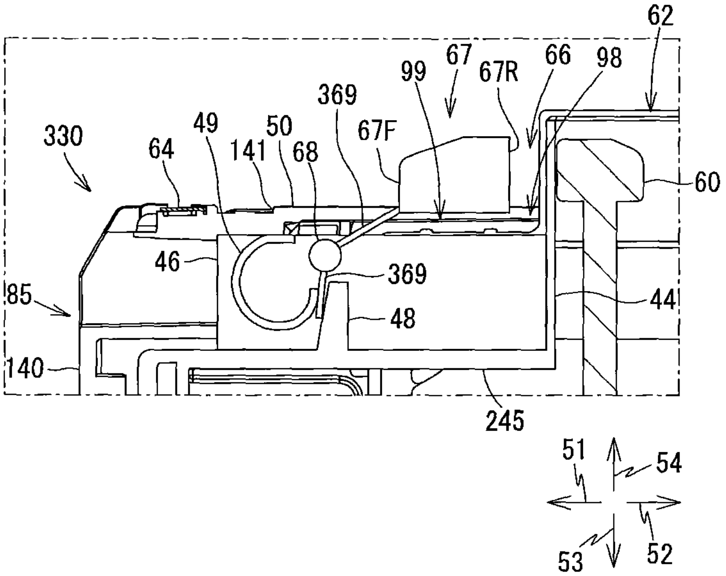
FIG. 16A is an enlarged view illustrating a state where the light-blocking plate is urged by a leaf spring to be in its first posture.
Figure 16B:
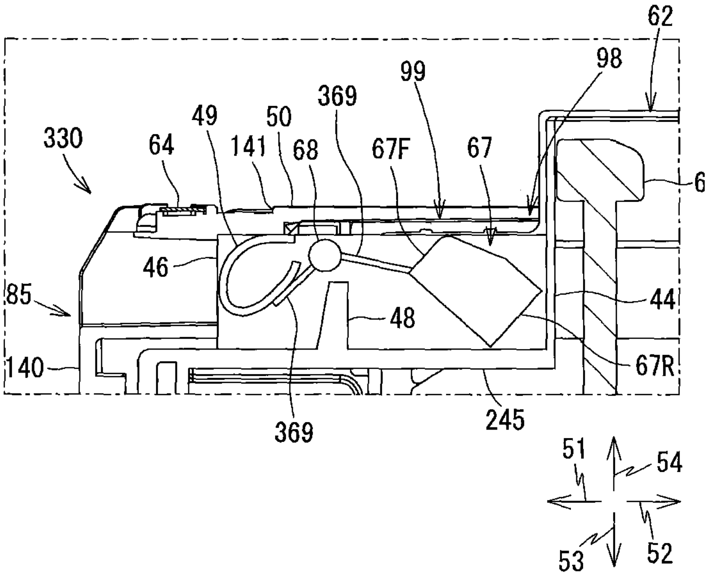
FIG. 16B is an enlarged view illustrating a state where the light-blocking plate is in its second posture against an urging force of the leaf spring.

Further, FIGS. 16A and 16B illustrates a second modification to the embodiment. In this second modification, an ink cartridge 330 includes two arms 369, and a leaf spring 49 in place of the leaf spring 47 in the first modification. The leaf spring 49 is connected to one of the arms 369 and has a curved shape extending upward. By contact of the leaf spring 49 with a wall 50 defining the top wall 141 of the front cover 32, the leaf spring 49 urges the one of the arms 369 counterclockwise in FIGS. 16A and 16B.

As illustrated in FIG. 16A, the one of the arms 369 is in contact with the stopper 48 provided on the wall 245 due to an urging force of the leaf spring 49, whereby the light-blocking plate 67 is positioned in the pivot position, i.e., in the first posture. In other words, the leaf spring 49 urges the light-blocking plate 67 toward the first posture. When an external force directed rearward is applied to the light-blocking plate 67, the light-blocking plate 67 is pivotally moved clockwise against the urging force of the leaf spring 49 to become the second posture illustrated in FIG. 16B.

In the above-described embodiment, the detection portion 62 is used with the detection member 59 pivotally movable about the pivot shaft 61. However, another configuration may be employed. In a third modification illustrated in FIGS. 17A to 18, an ink cartridge 430 includes a prism 131, and a pair of reflection plates 132.

The pair of reflection plate 132 are positioned between the light-emitting element and the light-receiving element of the sensor 103 in the left-right direction 55 and 56 and are arranged to be separated away from each other in the left-right direction 55 and 56. The pair of reflection plates 132 define therebetween a space extending in the left-right direction 55 and 56. The light-blocking plate 67 is positioned between the pair of reflection plates 132 in the left-right direction 55 and 56. That is, when the ink cartridge is viewed from frontward thereof, the light-blocking plate 67 overlaps the space defined in the left-right direction 55 and 56 between the pair of the reflection plates 132. A distance between the pair of reflection plates 132 is greater than the width L2 in the left-right direction 55 and 56 of the light-blocking plate 67.

Figure 18:
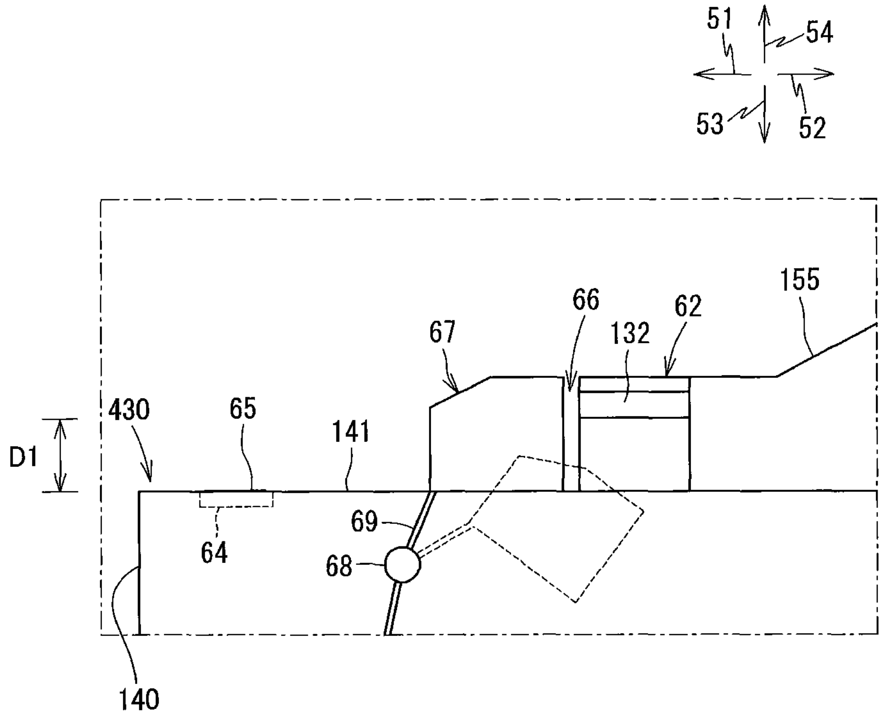
FIG. 18 is an enlarged view illustrating a state where the light-blocking plate is pivotally moved from the first posture to the second posture to enter a portion between the reflection plates.

As illustrated in FIG. 18, the light-blocking plate 67 is pivotally moved about the shaft 68 as in the above-described embodiment. During the pivotal movement of the light-blocking plate 67 from the first posture to the second posture, a portion of the light-blocking plate 67 enters the space between the pair of reflection plates 132. Note that the light-blocking plate 67 may be pivotally moved at a position frontward of the pair of reflection plates 132. Also note that, it is preferable that signals outputted from the sensor 103 during the attachment of the ink cartridge 30 to the cartridge-attachment section 110 in this case are the same as those in FIG. 13.

Figure 17B:
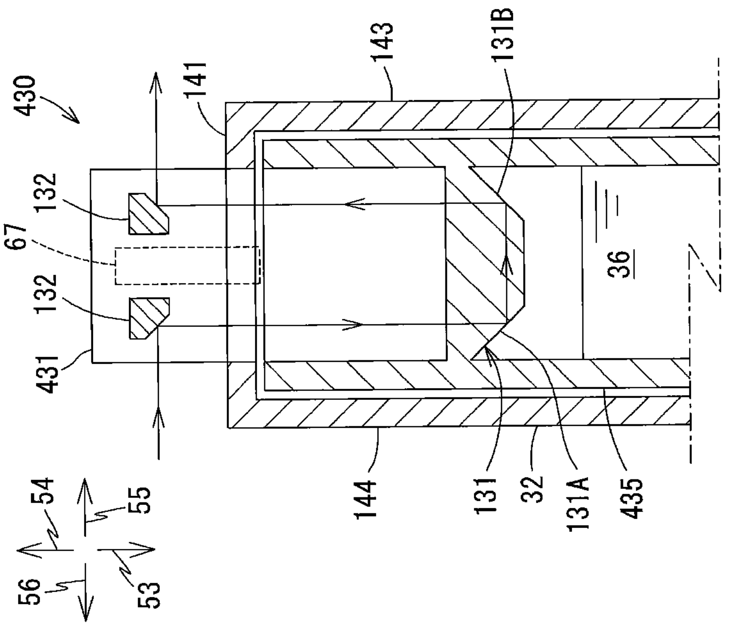
FIG. 17B is another view illustrating the prism and the reflection plates, and illustrating a state where the reflection surfaces of the prism reflect incident light.
Figure 17A:
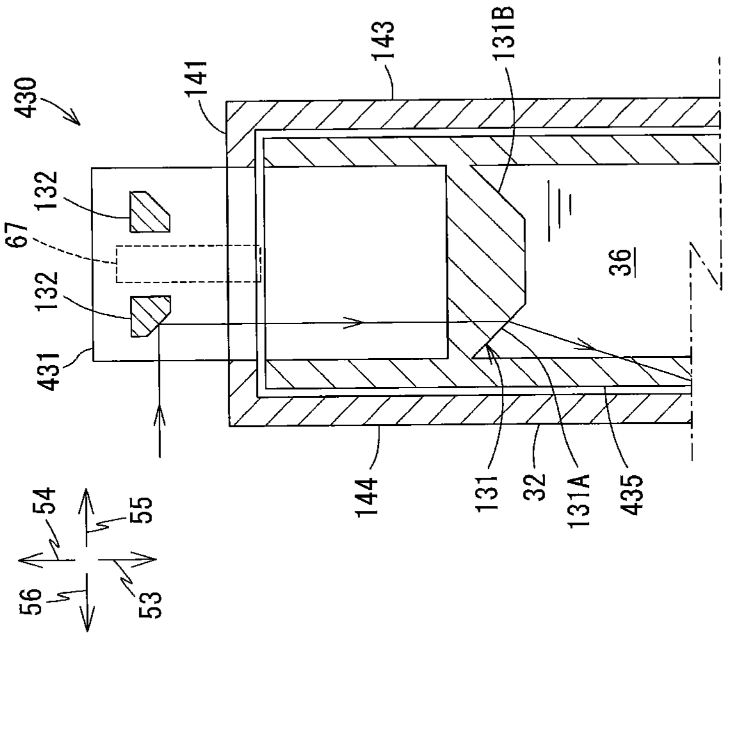
FIG. 17A is a view illustrating a prism and reflection plates, and illustrating a state where reflection surfaces of the prism do not reflect incident light.

As illustrated in FIGS. 17A and 17B, each of the reflection plates 132 is supported by a rear cover 431 at a position upward relative to the top wall 141 of the front cover 32, and extends in the front-rear direction 51 and 52. Each of the reflection plates 132 has a lower surface serving as a reflection surface inclined with respect to the left-right direction 55 and 56 by 45 degrees. The lower surface of each of the reflection plates 132 is positioned away from the electrode group 65 of the IC board 64 in the upward direction 54 by the first distance D1. One of the reflection plates 132 reflects the light emitted from the light-emitting element of the sensor 103 and traveling in the left-right direction 55 and 56 (the rightward direction 55 in FIG. 17) so that the reflected light advances in the downward direction 53. The remaining one of the reflection plates 132 reflects light advances in the upward direction 54 from the prism 131 so that the light reflected by the reflection plate 132 travels in the left-right direction 55 and 56 (the rightward direction 55 in FIG. 17) toward the light-receiving element of the sensor 103.

The prism 131 is provided in an inner frame 435 at a position below the pair of reflection plates 132. The prism 131 is made of synthetic resin, for example, to allow light to pass therethrough. The prism has reflection surfaces that can contact the ink stored in the ink chamber 36. Specifically, the prism 131 has a pair of reflection surfaces 131A and 131B. The reflection surfaces 131A and 131B are positioned below the pair of reflection plates 132, respectively, and are inclined by 45 degrees with respect to the left-right direction 55 and 56.

The reflection surfaces 131A and 131B refract light when the reflection surface 131A and 131B are in contact with ink, and reflect light when the reflection surfaces 131A and 131B are not in contact with ink. That is, whether the prism 131 refracts or reflects the incident light is dependent on whether or not the reflection surfaces 131A and 131B are in contact with the ink stored in the ink chamber 36. In other words, the reflection surfaces 131A and 131B change a direction in which the incident light travels depending on whether or not the reflection surfaces 131A and 131B are in contact with the ink in the ink chamber 36.

As illustrated in FIG. 17A, in a state where the reflection surfaces 131A and 131B of the prism 131 are in contact with the ink stored in the ink chamber 36, the light emitted from the light-emitting element of the sensor 103 is reflected by the one of the reflection plates 132 downward to the prism 131, and thereafter refracted by the reflection surface 131A of the prism 131 to advances toward the outside of the ink chamber 36. Accordingly, since the light-emitting element of the sensor 103 cannot receive the light emitted from the light-emitting element, the sensor 103 outputs a low-level signal.

As illustrated in FIG. 17B, when ink surface of the ink in the ink chamber 36 is lowered below the reflection surfaces 131A and 131B and is no longer in contact with the same, the light emitted from the light-emitting element of the sensor 103 is reflected by one of the reflection plates 132 and travels in the downward direction 53 toward the prism 131, and then reflected by the reflection surface 131A of the prism 131 toward the reflection surface 131B. Thereafter, the light is reflected by the reflection surface 131B to advance in the upward direction 54 toward the remaining one of the reflection plates 132, and reflected by the remaining one of the reflection plates 132 to finally reach the light-receiving element of the sensor 103. Accordingly, the sensor 103 outputs a high-level signal. Since the signal outputted from the sensor 103 varies depending on whether or not the ink in contact with the prism 131 in this way, the controller 130 can determine whether or not the ink is present at a position where the prism 131 is provided on the basis of the signal outputted from the sensor 103.

In the embodiment described above, the space 66 is provided between the light-blocking plate 67 and the detection portion 62 in the front-rear direction 51 and 52. Alternatively, instead of providing the space 66, a light-transmission portion made of a material capable of transmitting light therethrough may be provided between the light-blocking plate 67 and the detection portion 62 in the front-rear direction 51 and 52. The light-transmission portion may be configured as a part of the light-blocking plate 67, or a part of the detection portion 62, or a discrete member independent of each of the light-blocking plate 67 and the detection portion 62.

The electrode group 65 of the embodiment include only three electrodes: the power-supply electrode 65A, the signal electrode 65B, and the ground electrode 65C. However, the electrode group 65 may include more than three electrodes.

Figure 19:
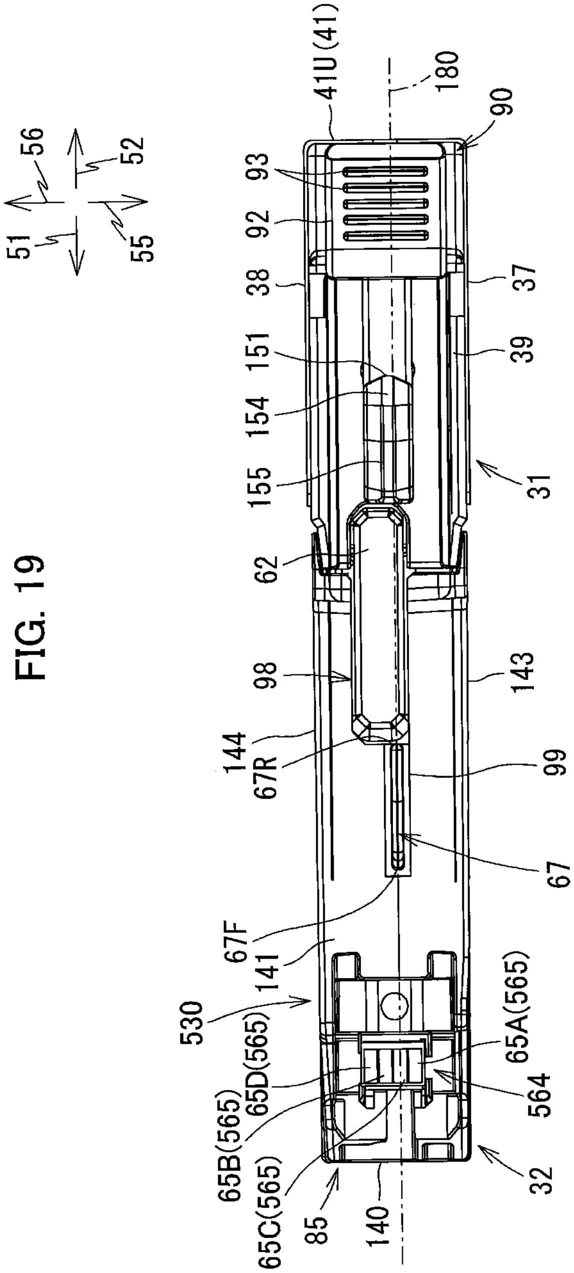
FIG. 19 is a top view of an ink cartridge including a dummy electrode.

For example, FIG. 19 illustrates an ink cartridge 530 according to a fourth modification to the embodiment. The ink cartridge 530 includes an IC board 564 including an electrode group 565. The electrode group 565 includes a dummy electrode 65D, in addition to the power-supply electrode 65A, the signal electrode 65B, and the ground electrode 65C. The dummy electrode 65D may be positioned outward of the power-supply electrode 65A or the signal electrode 65B in the left-right direction 55 and 56. That is, the power-supply electrode 65A may be interposed between the dummy electrode 65D and the ground electrode 65C, or the signal electrode 65B may be interposed between the dummy electrode 65D and the ground electrode 65C. In the example of FIG. 19, the dummy electrode 65D is positioned on the left of the signal electrode 65B and thus the signal electrode 65B is positioned between the dummy electrode 65D and the ground electrode 65C in the left-right direction 55 and 56.

Figure 20:
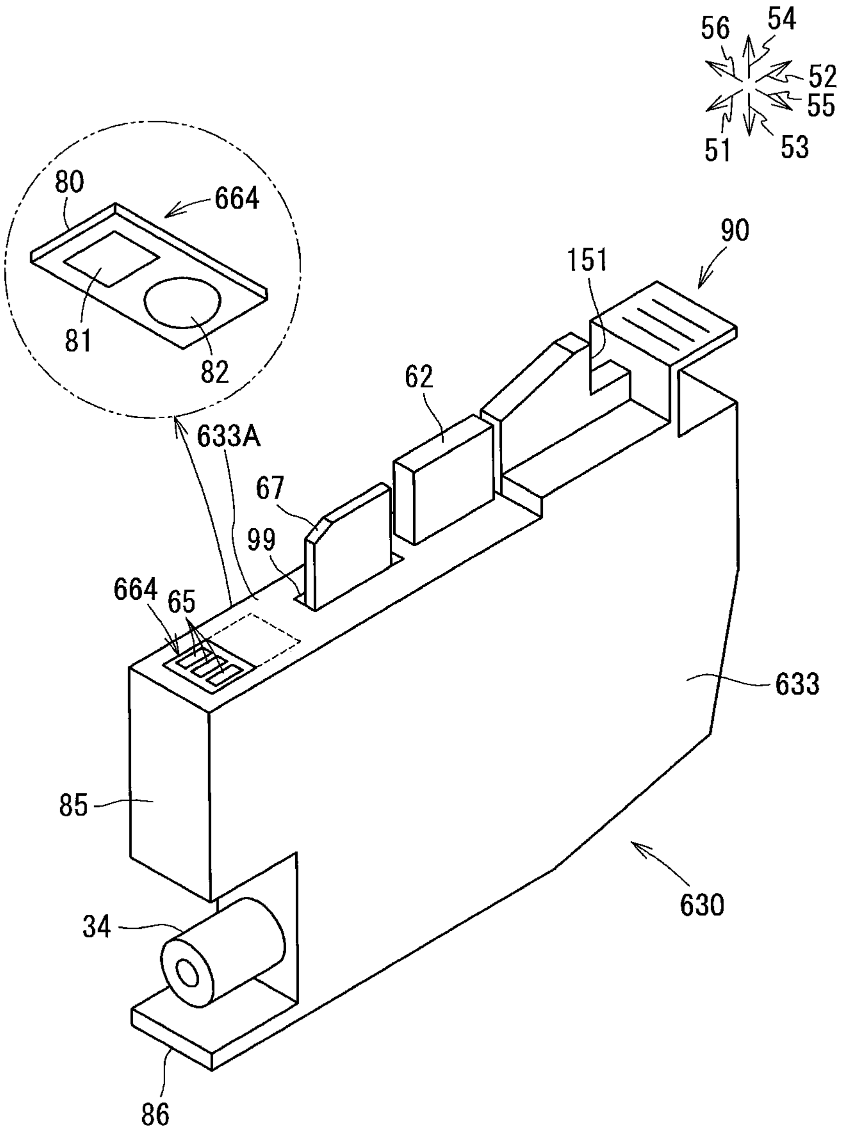
FIG. 20 is a perspective view of an ink cartridge.

FIG. 20 illustrates an ink cartridge 630 according to a fifth modification to the embodiment. The ink cartridge 630 includes an IC board 664, in place of the IC board 64 of the embodiment. The IC board 664 includes a substrate 80, the electrode group 65, an electrical circuit 81, and a battery 82. As illustrated in FIG. 20, the electrode group 65 is formed on an upper surface of the substrate 80, whereas the electrical circuit 81 and the battery 82 are mounted on a lower surface of the substrate 80 (see the enlarged portion of the substrate 80 enclosed by a two-dotted chain line in FIG. 20). Incidentally, the upper surface of the substrate 80 in its entirety need not be exposed to the outside. That is, only a part of the upper surface of the substrate 80 and the electrode group 65 may be exposed to the outside, and a remaining portion of the upper surface of the substrate 80 may be covered by a portion of a housing 633.

Further, the ink cartridge 630 of the fifth modification does not include the inner frame 35 inside the housing 633. That is, the inner frame 35 of the embodiment is not essential and may be dispensed with. A housing constituting an outer contour of an ink cartridge (such as the rear cover 31 and the front cover 32 of the embodiment) may define an internal space therein serving as the ink chamber 36. In the ink cartridge 630 of the fifth modification, the housing 633 has a general box shape, and defines an internal space therein that serves as the ink chamber 36. In the housing 633, the detection portion 62, the IC board 664, and the light-blocking plate 67 are arranged on a top surface 633A of the housing 633.

Figure 21:
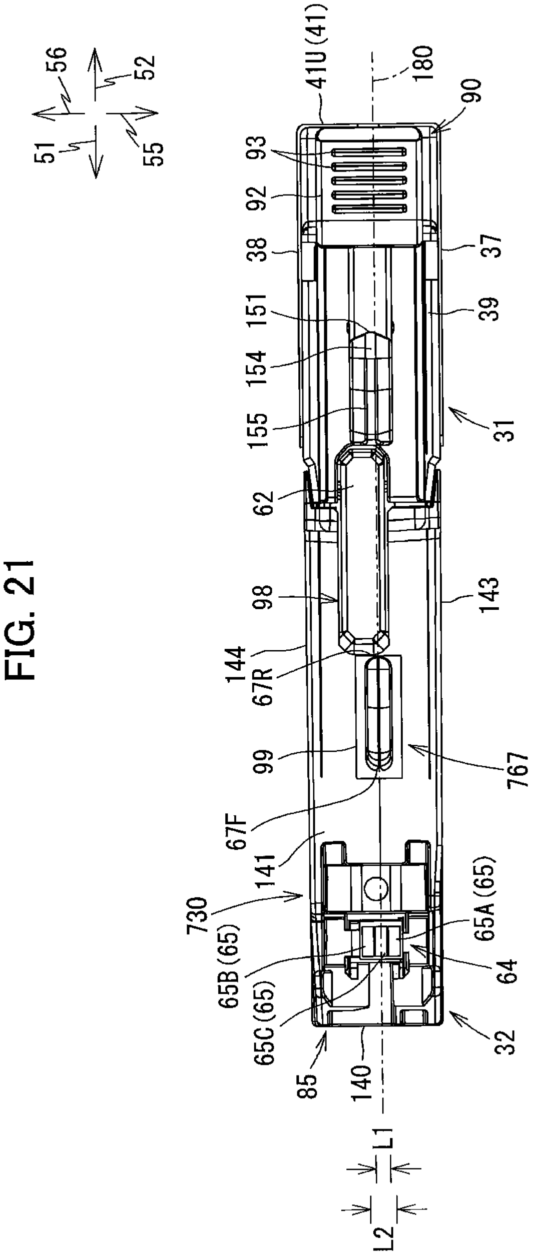
FIG. 21 is top view of an ink cartridge in which a dimension of a light-blocking plate is greater than a dimension of a ground electrode.

FIG. 21 illustrates a sixth modification to the embodiment. In an ink cartridge 730 according to the sixth modification, a width L2 in the left-right direction 55 and 56 of the top surface of a light-blocking plate 767 in its first posture is greater than the width L1 in the left-right direction 55 and 56 of the ground electrode (L1<L2), contrary to the embodiment. In this case, the light-blocking plate 767 is pivotally moved to its second posture as illustrated in FIG. 14 without entering the slit 108 during the attachment of the ink cartridge 30 to the cartridge-attachment section 110, if the width L2 is greater than a dimension in the left-right direction 55 and 56 of the slit 108.

Further, with a configuration where the width L2 is smaller than the width L1 in the left-right direction 55 and 56 of the ground electrode 65C in the above-described embodiment, the dimension in the left-right direction 55 and 56 of the slit 108 may be smaller than the width L2 in the left-right direction 55 and 56 of the top surface of the light-blocking plate 67. In this case, during the attachment of the ink cartridge 30 to the cartridge-attachment section 110, the light-blocking plate 67 in the first posture does not enter the slit 108 to thus be pivotally moved to the second posture as illustrated in FIG. 14.

In the embodiment described above, the front end 86A of the second protruding portion 86 protrudes frontward relative to the front end 34A of the ink supply portion 34 as best illustrated in FIG. 5. Alternatively, the front end 86A of the second protruding portion 86 may be positioned rearward of the front end 34A of the ink supply portion 34, or may be positioned at the same position as the front end 34A of the ink supply portion 34 in the front-rear direction 51 and 52.

In the embodiment described above, the detection member 59 and the detection portion 62 are configured to change a signal outputted from the sensor 103 to the controller 10 according to the amount of the ink stored in the ink chamber 36, but configurations other than that in the embodiment may be employed. For example, the detection member 59 and the detection portion 62 may change a state of light outputted from a sensor in the printer 10 when attachment of the ink cartridge 30 to the cartridge-attachment section 110 is completed so that the printer 10 can detect that the ink cartridge 30 has been completely attached to the cartridge-attachment section 110. In this case, the detection member 59 and the detection portion 62 may be formed or may be colored such that these components have low light transmittance. The detection member 59 and the detection portion 62 may be configured so that arbitrary information on the ink cartridge 30 attached to the printer 10 can be detected by the printer 10.

Note that, ink serves as an example of liquid of the disclosure in the above-described embodiment. However, the liquid of the disclosure is not limited to ink. For example, a pretreatment liquid that is to be ejected onto sheets prior to ink during a printing operation may be stored in the liquid cartridge of the disclosure. Alternatively, cleaning water for cleaning the recording head 21 may be stored in the liquid cartridge of the disclosure.

[Remarks]

The ink cartridges 30, 230, 330, 450, 530, 630, and 730 are examples of a liquid cartridge. The inner frame 35 and the housing 633 are examples of a cartridge case. The ink chamber 36 is an example of a liquid storage chamber. The ink supply portion 34 is an example of a liquid supply portion. The IC boards 64, 564, and 664 are examples of a circuit board. The light-blocking plates 67 and 767 are examples of a plate member. The detection member 59 and the detection portion 62, and the prism 131 and the reflection plate 132 are examples of a residual-amount detecting portion. The detection member 59 and the detection portion 62, and the prism 131 and the reflection plates 132 are also examples of a cartridge detecting portion. The light-blocking plate 60 and the reflection plate 132 is an example of an optical access portion. The space 66 is an example of a light transmissive region. The power-supply electrode 65A is an example of a first electrode. The signal electrode 65B is an example of a second electrode. The ground electrode 65C is an example of a third electrode. The leaf springs 47 and 49 are examples of an elastic member. The cartridge-attachment section 110 is an example of an attachment portion. The recording head 21 is an example of a consuming portion. The ink needles 102 are an examples of a liquid supply tube.

What is claimed is:

1. A liquid cartridge movable relative to a printer in a front-rear direction crossing an up-down direction along a gravitational direction to be attached to the printer in an attached posture, the liquid cartridge comprising:

a cartridge case defining therein a liquid storage chamber, the cartridge case having a front surface;

a liquid supply portion protruding frontward from the front surface of the cartridge case and configured to supply liquid stored in the liquid storage chamber to an outside;

a circuit board comprising an electrode group comprising at least three electrodes, the at least three electrodes facing upward and being exposed to the outside in the attached posture;

a plate member extending in the front-rear direction and positioned rearward of the electrode group in the attached posture; and a residual-amount detecting portion positioned upward relative to the electrode group and rearward of the plate member in the attached posture, the residual-amount detecting portion being configured to change a state of incident light according to an amount of the liquid stored in the liquid storage chamber, the residual-amount detecting portion comprising an optical access portion on which light traveling in a left-right direction crossing the up-down direction and the front-rear direction is incident in the attached posture, wherein the plate member is pivotally movable about an axis extending in the left-right direction between:

a first posture in which a portion of the plate member is positioned upward relative to the optical access portion; and a second posture in which the plate member is positioned downward relative to the optical access portion, the plate member in the second posture being positioned rearward relative to the plate member in the first posture, and wherein the plate member in the first posture and the residual-amount detecting portion define a light transmissive region therebetween in the front-rear direction, the light transmissive region having a light transmittance greater than a light transmittance of the plate member.

2. The liquid cartridge according to claim 1, wherein the electrode group comprises a first electrode, a second electrode, and a third electrode arranged in the left-right direction such that the third electrode is positioned between the first electrode and the second electrode in the left-right direction, each of the first electrode, the second electrode, and the third electrode being electrically connected to the printer when the liquid cartridge is attached to the printer, wherein the third electrode is a ground electrode for grounding, and wherein the third electrode and an upper end of the plate member are arranged to intersect an imaginary plane extending in the up-down direction and the front-rear direction.

3. The liquid cartridge according to claim 2, wherein, when the plate member is in the first posture, the upper end of the plate member is positioned between one end and another end in the left-right direction of the residual-amount detecting portion in the left-right direction.

4. The liquid cartridge according to claim 1, wherein the light transmissive region is provided by a space.

5. The liquid cartridge according to claim 1, further comprising an elastic member urging the plate member toward the first posture.

6. The liquid cartridge according to claim 1, further comprising a weight configured to pivotally move the plate member toward the first posture, wherein the plate member in the first posture is positioned upward relative to the electrode group.

7. The liquid cartridge according to claim 1, wherein the residual-amount detecting portion further comprises a prism having a reflection surface whose reflection manner is dependent on whether or not the reflection surface is in contact with the liquid, and wherein the optical access portion is configured to receive the light traveling in the left-right direction and to reflect the light toward the prism.

8. The liquid cartridge according to claim 1, wherein the optical access portion comprises a first reflection plate and a second reflection plate arranged to be spaced apart from each other in the left-right direction, and wherein at least a portion of the plate member enters a portion between the first reflection plate and the second reflection plate during pivotal movement of the plate member from the first posture to the second posture.

9. The liquid cartridge according to claim 1, wherein the optical access portion is movable between a first position and a second position different from the first position according to the amount of the liquid stored in the liquid storage chamber, the optical access portion at the first position being configured to block or attenuate the incident light.

10. The liquid cartridge according to claim 1, wherein the light traveling in the left-right direction is configured to be incident on each of the plate member and the optical access portion during a process of attachment of the liquid cartridge to the printer.

11. The liquid cartridge according to claim 1, wherein, when the plate member is in the second posture, an upper end of the plate member is positioned downward relative to the optical access portion and relative to the electrode group.

12. A liquid cartridge comprising:

a cartridge case defining therein a liquid storage chamber;

a liquid supply portion protruding frontward from the cartridge case in a front-rear direction and configured to supply liquid stored in the liquid storage chamber to an outside;

a circuit board positioned upward relative to and away from the liquid supply portion in an up-down direction crossing the front-rear direction, the circuit board comprising an electrode group comprising at least three electrodes, the at least three electrodes facing upward in the up-down direction and being exposed to the outside;

a plate member extending in the front-rear direction and positioned rearward of the electrode group; and a cartridge detecting portion comprising an optical access portion positioned upward relative to the electrode group in the up-down direction and rearward of the plate member, the optical access portion being accessible by light traveling in a left-right direction crossing the up-down direction and the front-rear direction, wherein the plate member is pivotally movable about an axis extending in the left-right direction between:

a first posture in which a portion of the plate member is positioned upward relative to the optical access portion in the up-down direction; and a second posture in which the plate member is positioned downward relative to the optical access portion in the up-down direction, the plate member in the second posture being positioned rearward relative to the plate member in the first posture, and wherein the plate member in the first posture and the cartridge detecting portion are spaced apart from each other in the front-rear direction.

13. The liquid cartridge according to claim 12, wherein the cartridge detecting portion is configured to change a state of incident light according to an amount of the liquid stored in the liquid storage chamber.

14. The liquid cartridge according to claim 13, wherein the optical access portion is movable according to the amount of the liquid stored in the liquid storage chamber.

15. The liquid cartridge according to claim 13, wherein the optical access portion is not movable according to the amount of the liquid stored in the liquid storage chamber.

16. The liquid cartridge according to claim 12, wherein the electrode group comprises a first electrode, a second electrode, and a third electrode arranged in the left-right direction such that the third electrode is positioned between the first electrode and the second electrode in the left-right direction, wherein the third electrode is a ground electrode for grounding, and wherein the third electrode and an upper end of the plate member are arranged to intersect an imaginary plane extending in the up-down direction and the front-rear direction.

17. The liquid cartridge according to claim 16, wherein, when the plate member is in the first posture, the upper end of the plate member is positioned between one end and another end in the left-right direction of the cartridge detecting portion in the left-right direction.

18. The liquid cartridge according to claim 12, further comprising an elastic member urging the plate member toward the first posture.

19. The liquid cartridge according to claim 12, further comprising a weight configured to pivotally move the plate member toward the first posture, wherein the plate member in the first posture is positioned upward relative to the electrode group.

20. The liquid cartridge according to claim 12, wherein the cartridge detecting portion further comprises a prism having a reflection surface whose reflection manner is dependent on whether or not the reflection surface is in contact with the liquid, and wherein the optical access portion is configured to receive the light traveling in the left-right direction and to reflect the light toward the prism.

21. The liquid cartridge according to claim 12, wherein the optical access portion comprises a first reflection plate and a second reflection plate arranged to be spaced apart from each other in the left-right direction, and wherein at least a portion of the plate member enters a portion between the first reflection plate and the second reflection plate during pivotal movement of the plate member from the first posture to the second posture.

22. The liquid cartridge according to claim 12, wherein the light traveling in the left-right direction is configured to be incident on each of the plate member and the optical access portion during a process of attachment of the liquid cartridge to the printer.

23. The liquid cartridge according to claim 12, wherein, when the plate member is in the second posture, an upper end of the plate member is positioned downward relative to the optical access portion and relative to the electrode group.

* * * * *